(12) United States Patent
Lee et al.

(10) Patent No.: US 12,106,256 B2
(45) Date of Patent: Oct. 1, 2024

(54) LOGISTICS SYSTEM, UNMANNED AERIAL VEHICLE, AND CARGO MANAGEMENT METHOD

(71) Applicant: RAKUTEN GROUP, INC., Tokyo (JP)

(72) Inventors: Kenichi Lee, Tokyo (JP); Toshiaki Tazume, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 566 days.

(21) Appl. No.: 17/413,576

(22) PCT Filed: Dec. 27, 2018

(86) PCT No.: PCT/JP2018/048258
§ 371 (c)(1),
(2) Date: Jun. 14, 2021

(87) PCT Pub. No.: WO2020/136832
PCT Pub. Date: Jul. 2, 2020

(65) Prior Publication Data
US 2022/0076192 A1 Mar. 10, 2022

(51) Int. Cl.
*G06Q 10/083* (2024.01)
*B64D 1/22* (2006.01)
(Continued)

(52) U.S. Cl.
CPC .............. *G06Q 10/083* (2013.01); *B64D 1/22* (2013.01); *B64U 10/13* (2023.01); *B65G 1/1371* (2013.01);
(Continued)

(58) Field of Classification Search
CPC ...... G06Q 10/083; B64C 39/024; B64D 1/22; B65G 1/1371; B65G 1/1373;
(Continued)

(56) References Cited

U.S. PATENT DOCUMENTS 9,850,001 B1 12/2017 Gill et al.
2015/0317597 A1 11/2015 Shucker et al.
(Continued)

FOREIGN PATENT DOCUMENTS

WO 2017006421 A1 1/2017

OTHER PUBLICATIONS

International Search Report for PCT/JP2018/048258 with English translation pp. 1-4.

*Primary Examiner* — Peter D Nolan
*Assistant Examiner* — Roy Rhee
(74) *Attorney, Agent, or Firm* — HEA Law PLLC

(57) ABSTRACT

A logistics system, comprising: an unmanned aerial vehicle including: a holder configured to hold a package to which a readable medium including package identification information is attached; and a reader configured to read the readable medium when the package is held by the holder; and at least one processor configured to: generate, after the readable medium is read by the reader, flight plan information on the unmanned aerial vehicle based or information read from the readable medium; and control the unmanned aerial vehicle based on the flight plan information.

14 Claims, 11 Drawing Sheets

(51) Int. Cl.
*B64U 10/13* (2023.01)
*B64U 101/30* (2023.01)
*B65G 1/137* (2006.01)
*G05D 1/00* (2006.01)
*G06K 7/10* (2006.01)
*G06K 7/14* (2006.01)
*G06K 19/06* (2006.01)
*G06K 19/07* (2006.01)
*B64U 101/64* (2023.01)

(52) U.S. Cl.
CPC .......... *B65G 1/1373* (2013.01); *G05D 1/104* (2013.01); *G06K 7/10366* (2013.01); *G06K 7/1417* (2013.01); *G06K 19/06037* (2013.01); *G06K 19/0723* (2013.01); *B64U 2101/30* (2023.01); *B64U 2101/64* (2023.01); *B65G 2203/0216* (2013.01)

(58) Field of Classification Search
CPC ............ B65G 2203/0216; G05D 1/104; B64U 10/13; B64U 2101/60
See application file for complete search history.

(56) References Cited

U.S. PATENT DOCUMENTS

| | | |
|---|---|---|
| 2016/0224932 A1 | 8/2016 | Shucker et al. |
| 2016/0232487 A1* | 8/2016 | Yonker .............. G06Q 10/0834 |
| 2017/0132566 A1 | 5/2017 | High et al. |
| 2017/0220981 A1 | 8/2017 | Shucker et al. |
| 2018/0092484 A1* | 4/2018 | Lewis .................... A47G 29/20 |
| 2018/0144286 A1 | 5/2018 | Shucker et al. |
| 2018/0203465 A1 | 7/2018 | Suzuki |
| 2018/0229843 A1 | 8/2018 | Costanzo et al. |
| 2018/0265222 A1 | 9/2018 | Takagi |
| 2019/0102730 A1* | 4/2019 | Giorgi .................... H04L 67/12 |
| 2019/0171994 A1 | 6/2019 | Shucker et al. |
| 2019/0197646 A1* | 6/2019 | Prager ................... G06Q 50/30 |
| 2021/0039785 A1 | 2/2021 | Costanzo et al. |
| 2021/0070546 A1 | 3/2021 | Li |
| 2021/0080977 A1 | 3/2021 | Suzuki |

* cited by examiner

| PACKAGE ID | PACKAGE INFORMATION | USER INFORMATION | UNMANNED AERIAL VEHICLE ID | CARRIAGE DESTINATION INFORMATION |
|---|---|---|---|---|
| c00001 | i00001,XXX CHOCOLATE··· | u00001,USER A··· | d00001 | ···,SETAGAYA-KU, TOKYO |
| c00002 | i00004,CANNED BEER··· | u00002,USER B··· | — | — |
| c00003 | i00008,TISSUE··· | u00003,USER C··· | d00002 | ···,OTA-KU, TOKYO |
| ⋮ | ⋮ | ⋮ | ⋮ | ⋮ |

| ARRIVAL TIME INFORMATION | LANDING PLACE | ESTIMATED ARRIVAL TIME INFORMATION | STATUS |
|---|---|---|---|
| 16:00–18:00, DECEMBER 26, 2018 | OTHER | 17:12, DECEMBER 26, 2018 | BEFORE TAKEOFF |
| — | — | — | — |
| 10:00–12:00, DECEMBER 27, 2018 | PORT | 11:55, DECEMBER 27, 2018 | BEFORE TAKEOFF |
| ⋮ | ⋮ | ⋮ | ⋮ |

| UNMANNED AERIAL VEHICLE ID | VEHICLE BODY INFORMATION | PACKAGE ID | CARRIAGE DESTINATION INFORMATION | ARRIVAL TIME INFORMATION |
|---|---|---|---|---|
| d00001 | MODEL X | c00001 | ... SETAGAYA-KU, TOKYO | 16:00-18:00, DECEMBER 26, 2018 |
| d00002 | MODEL X | c00003 | ... OTA-KU, TOKYO | 10:00-12:00, DECEMBER 27, 2018 |
| d00003 | MODEL Y | - | ... | ... |
| ... | ... | ... | ... | ... |

| | FLIGHT PLAN INFORMATION | | | CARRYING SITUATION | |
|---|---|---|---|---|---|
| LANDING PLACE | FLIGHT ROUTE | SCHEDULED TAKEOFF TIME INFORMATION | ESTIMATED ARRIVAL TIME INFORMATION | STATUS | POSITIONAL INFORMATION |
| OTHER | FLIGHT ROUTE 1 | 16:40, DECEMBER 26, 2018 | 17:12, DECEMBER 26, 2018 | BEFORE TAKEOFF | X1,Y1 |
| PORT | FLIGHT ROUTE 2 | 11:20, DECEMBER 27, 2018 | 11:55, DECEMBER 27, 2018 | BEFORE TAKEOFF | X2,Y2 |
| - | - | - | - | - | - |
| ... | ... | ... | ... | ... | ... |

LOGISTICS SYSTEM, UNMANNED AERIAL VEHICLE, AND CARGO MANAGEMENT METHOD

CROSS REFERENCE TO RELATED APPLICATIONS

This application is a National Stage of International Application No. PCT/JP2018/048258 filed on Dec. 27, 2018. The contents of the above document is incorporated herein by reference in its entirety.

TECHNICAL FIELD

The one or more embodiments of the present invention relates to a logistics system, an unmanned aerial vehicle, and a package management method.

BACKGROUND ART

Hitherto, there has been known a technology for causing an unmanned aerial vehicle to carry a package. For example, in Patent Literature 1, there is described a system in which, after an unmanned aerial vehicle collects a package from a package sender and moves to a delivery destination, when a package receiver transmits a security code through use of electronic mail, the unmanned aerial vehicle delivers the package to the package receiver.

CITATION LIST

Patent Literature

[PTL 1] JP 2005-263112 A

SUMMARY OF INVENTION

Technical Problem

However, in the technology of Patent Literature 1, it is not managed which unmanned aerial vehicle is carrying which package. For that reason, for example, when the package sender erroneously loads the unmanned aerial vehicle with another package, the package receiver cannot notice that fact until the package is received, to thereby cause erroneous delivery of the package. In addition, for example, in a case in which a package sender ships a plurality of packages, even when a trouble occurs in an unmanned aerial vehicle carrying the package, it is not possible to identify which package is having the trouble in carriage.

The one or more embodiments of the present invention has been made in view of the above-mentioned issues, and an object thereof is to provide a logistics system, an unmanned aerial vehicle, and a package management method which are capable of easily managing a package carried by an unmanned aerial vehicle.

Solution to Problem

In order to solve the above-mentioned issues, according to one or more embodiments of the present invention, there is provided a logistics system including: an unmanned aerial vehicle including: holding means for holding a package to which a readable medium including package identification information is attached; reading means for reading the readable medium when the package is held by the holding means; and transmission means for transmitting the package identification information and unmanned aerial vehicle identification information when the readable medium is read by the reading means; and storage control means for storing the package identification information and the unmanned aerial vehicle identification information, which have been transmitted by the transmission means, in storage means in association with each other.

According to one or more embodiments of the present invention, there is provided an unmanned aerial vehicle including: holding means for holding a package to which a readable medium including package identification information is attached; reading means for reading the readable medium when the package is held by the holding means; and transmission means for transmitting the package identification information and unmanned aerial vehicle identification information when the readable medium is read by the reading means.

According to one or more embodiments of the present invention, there is provided a package management method including: a reading step of reading, by an unmanned aerial vehicle configured to hold a package to which a readable medium including package identification information is attached, the readable medium when the package is held by the unmanned aerial vehicle; a transmission step of transmitting the package identification information read in the reading step and unmanned aerial vehicle identification information; and a storage control step of storing the package identification information and the unmanned aerial vehicle identification information, which have been transmitted in the transmission step, in storage means in association with each other.

Further, according to one aspect of the present invention, the logistics system further includes: generation means for generating, when the readable medium is read by the reading means, flight plan information on the unmanned aerial vehicle based on information included in the readable medium; and flight control means for flying the unmanned aerial vehicle based on the flight plan information.

Further, according to one aspect of the present invention, the logistics system further includes registration means for registering the package identification information and at least one of carriage destination information and arrival time information in association with each other, and the generation means is configured to generate the flight plan information based on the at least one of the carriage destination information and the arrival time information that has been associated with the package identification information transmitted by the transmission means.

Further, according to one aspect of the present invention, the logistics system further includes changing means for changing the at least one of the carriage destination information and the arrival time information that has been registered by the registration means, and the generation means is configured to generate, when the package identification information is transmitted by the transmission means after a change is made by the changing means, the flight plan information based on the at least one of the carriage destination information and the arrival time information that has been changed by the changing means.

Further, according to one aspect of the present invention, the package is a product ordered by a user, the registration means is implemented by an order management system configured to manage the order of the product, and the generation means is implemented by a system different from the order reception system, and is configured to inquire the at least one of the carriage destination information and the arrival time information from the order reception system.

Further, according to one aspect of the present invention, the registration means is further configured to register package type information in association with the package identification information, and the generation means is configured to generate the flight plan information based further on the package type information associated with the package identification information transmitted by the transmission means.

Further, according to one aspect of the present invention, the unmanned aerial vehicle further includes detection means for detecting positional information on the unmanned aerial vehicle, the transmission means is further configured to transmit the positional information detected by the detection means, and the generation means is configured to generate the flight plan information based further on the positional information transmitted by the transmission means.

Further, according to one aspect of the present invention, the readable medium includes at least one of carriage destination information and arrival time information, the transmission means is further configured to transmit, when the readable medium is read by the reading means, the at least one of carriage destination information and arrival time information, and the generation means is configured to generate, when the readable medium is read by the reading means, the flight plan information based on the at least one of the carriage destination information and the arrival time information that is included in the readable medium.

Further, according to one aspect of the present invention, the unmanned aerial vehicle further includes detection means for detecting positional information on the unmanned aerial vehicle, the transmission means is further configured to transmit, when the package is carried by the unmanned aerial vehicle, the positional information detected by the detection means, and the storage control means is configured to store the positional information transmitted by the transmission means in the storage means further in association with one another.

Further, according to one aspect of the present invention, the logistics system further includes providing means for providing, when the package identification information is designated by a user, a carrying situation of the package indicated by the designated package identification information to the user based on the positional information associated with the designated package identification information.

Further, according to one aspect of the present invention, the readable medium is code information attached to the package, the reading means is a code reader configured to read the code information, and the transmission means is configured to transmit, when the code information is read by the code reader, the unmanned aerial vehicle identification information and the package identification information.

Further, according to one aspect of the present invention, a position of the code information at which the code information is to be attached to the package is determined in advance, and the code reader is provided at such a position as to enable the code reader to read the code information attached at the position when the package is held by the holding means.

Further, according to one aspect of the present invention, the logistics system has each of a plurality of packages carried by each of a plurality of unmanned aerial vehicles, the logistics system further includes: first conveying means for conveying each of the plurality of unmanned aerial vehicles; and second conveying means for conveying each of the plurality of packages, any one of the plurality of packages conveyed by the second conveying means is stored in each of the plurality of unmanned aerial vehicles conveyed by the first conveying means, and the reading means of each of the plurality of unmanned aerial vehicles is configured to read the readable medium on the package stored in the holding means.

Further, according to one aspect of the present invention, the reading means and the transmission means are implemented by a reader device provided separately from the unmanned aerial vehicle, the reader device is connected to the unmanned aerial vehicle, and is included in the unmanned aerial vehicle as an external device of the unmanned aerial vehicle, and the transmission means of the reader device is configured to acquire and transmit, when the readable medium is read by the reading means, the unmanned aerial vehicle identification information stored in the unmanned aerial vehicle.

Further, according to one aspect of the present invention, the holding means is capable of holding a plurality of packages, the readable medium is attached to each of the plurality of packages, the readable medium including the package identification information on the each of the plurality of packages, the reading means is configured to read, when the plurality of packages are held by the holding means, the readable medium on each of the plurality of packages, the transmission means is configured to transmit, when the readable medium on each of the plurality of packages is read by the reading means, the package identification information on each of the plurality of packages and the unmanned aerial vehicle identification information, and the storage control means is configured to store, in the storage means, the package identification information on each of the plurality of packages and the unmanned aerial vehicle identification information in association with each other.

Advantageous Effects of Invention

According to the one or more embodiments of the present invention, it is possible to easily manage the package carried by the unmanned aerial vehicle.

BRIEF DESCRIPTION OF DRAWINGS

FIG. 7 is a table for showing an example of data storage of order management data.

FIG. 8 is a table for showing an example of data storage of unmanned aerial vehicle management data.

DESCRIPTION OF EMBODIMENTS

1. Entire Configuration of Logistics System

Figure 1:
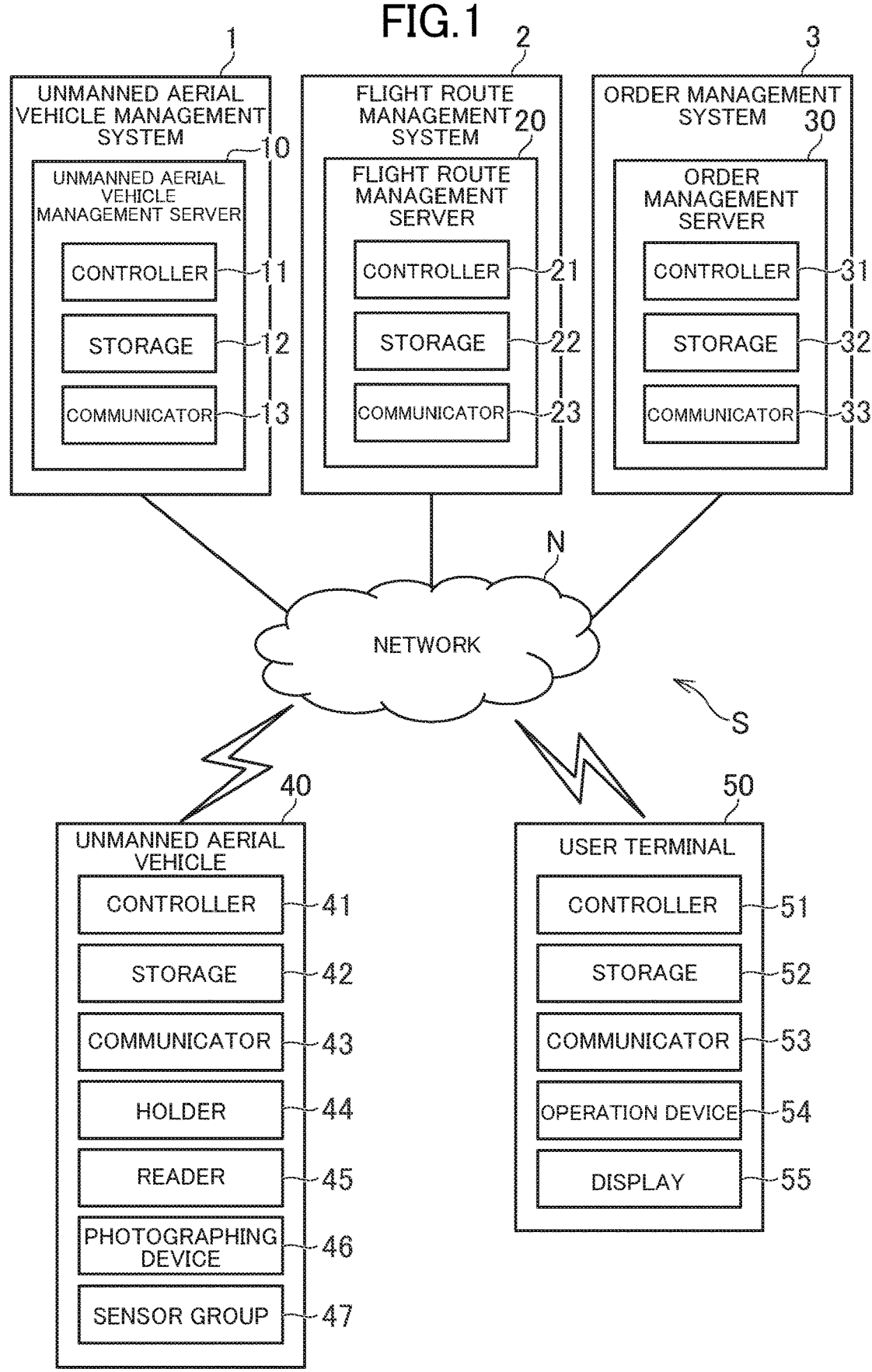
FIG. 1 is a diagram for illustrating an entire configuration of a logistics system.

Now, an example of a logistics system according to an embodiment of the present invention is described. FIG. 1 is a diagram for illustrating an entire configuration of the logistics system. As illustrated in FIG. 1, a logistics system S includes an unmanned aerial vehicle management system 1, a flight route management system 2, an order management system 3, an unmanned aerial vehicle 40, and a user terminal 50, and those components are connected to a network N. In FIG. 1, one unmanned aerial vehicle 40 and one user terminal 50 are illustrated. However, there may be a plurality of unmanned aerial vehicles 40 and a plurality of user terminals 50.

The unmanned aerial vehicle management system 1 is a system configured to manage the unmanned aerial vehicle 40, and includes an unmanned aerial vehicle management server 10. The unmanned aerial vehicle management server 10 is a server computer, and includes a controller 11, a storage 12, and a communicator 13. The unmanned aerial vehicle management system 1 may include a plurality of server computers.

The controller 11 includes, for example, at least one microprocessor. The controller 11 executes processing in accordance with programs and data stored in the storage 12. The storage 12 includes a main memory and an auxiliary memory. For example, the main memory is a volatile memory, for example, a RAM, and the auxiliary memory is a non-volatile memory such as a ROM, an EEPROM, a flash memory, or a hard disk drive. The communicator 13 is a communication interface for wired communication or wireless communication, and is configured to perform data communication via the network N.

The flight route management system 2 is a system configured to manage a flight route of the unmanned aerial vehicle 40, and includes a flight route management server 20. The flight route management server 20 is a server computer, and includes a controller 21, a storage 22, and a communicator 23. The flight route management system 2 may include a plurality of server computers. The controller 21, the storage 22, and the communicator 23 may have the same configurations as those of the controller 11, the storage 12, and the communicator 13.

The order management system 3 is a system configured to manage an order of a product, and includes an order management server 30. The order management server 30 is a server computer, and includes a controller 31, a storage 32, and a communicator 33. The order management system 3 may include a plurality of server computers. The controller 31, the storage 32, and the communicator 33 may have the same configurations as those of the controller 11, the storage 12, and the communicator 13.

The unmanned aerial vehicle 40 is an aerial vehicle without a pilot, and is, for example, an unmanned aerial vehicle (so-called "drone") configured to be driven by a battery, or an unmanned aerial vehicle configured to be driven by an engine. The unmanned aerial vehicle 40 includes a controller 41, a storage 42, a communicator 43, a holder 44, a reader 45, a photographing device 46, and a sensor group 47. Although the unmanned aerial vehicle 40 includes a propeller, a motor, a battery, and an antenna, for example, description thereof is omitted here.

The hardware configurations of the controller 41, the storage 42, and the communicator 43 may be similar to those of the controller 11, the storage 12, and the communicator 13. The communicator 43 may include a wireless communication interface for a specific device (e.g., so-called "radio controller"), such as FASST, FHSS, DMSS, or AFHSS. The unmanned aerial vehicle 40 may be operated by wirelessly communicating to/from a controller (so-called "proportional controller") via the communicator 43.

Figure 2:
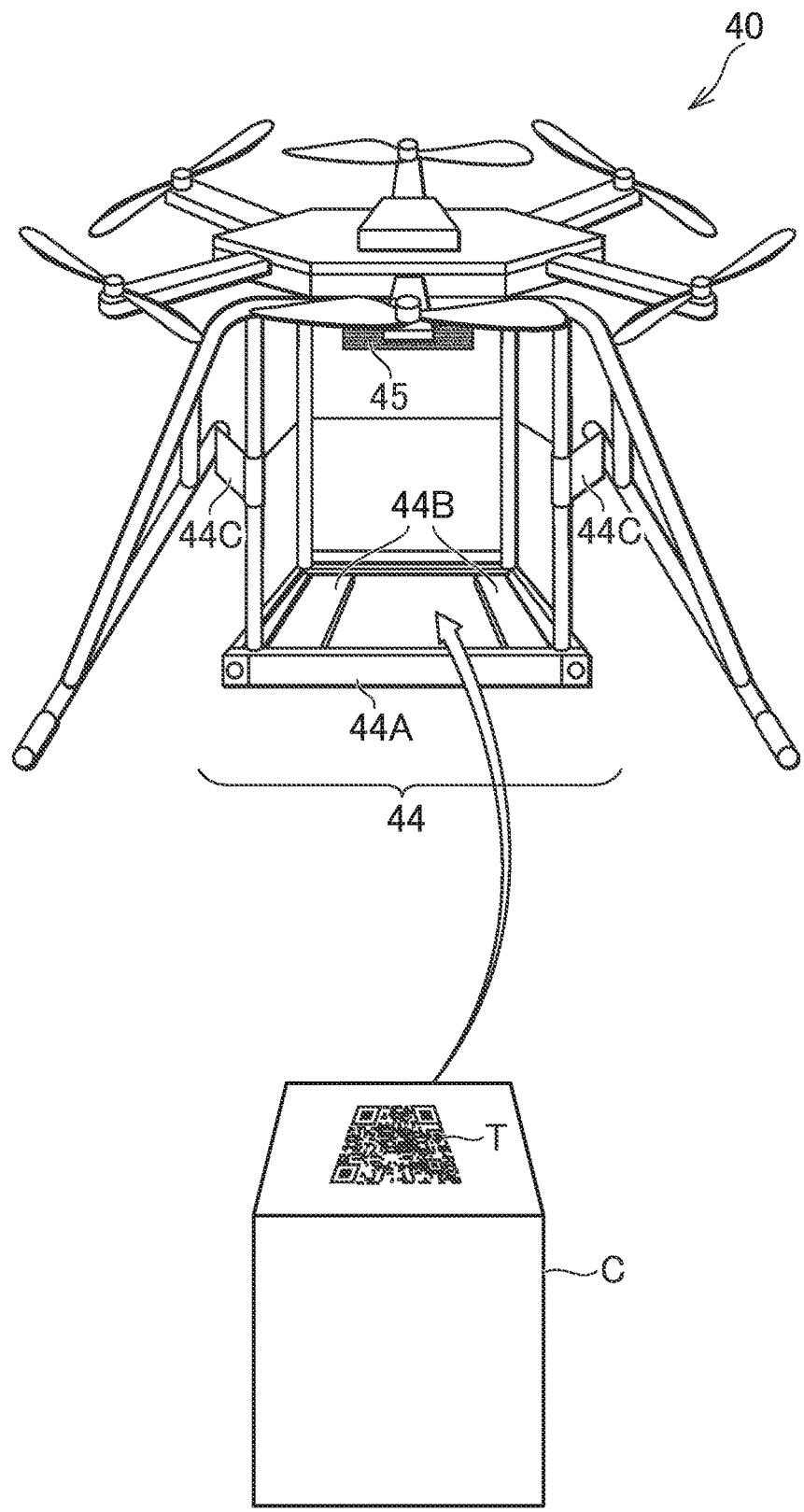
FIG. 2 is a diagram for illustrating details of a holder and a reader of an unmanned aerial vehicle.

FIG. 2 is a diagram for illustrating details of the holder 44 and the reader 45 of the unmanned aerial vehicle 40. As illustrated in FIG. 2, the holder 44 is a holding member configured to hold a package C, and is provided on a bottom surface side of a main body of the unmanned aerial vehicle 40. For example, the holder 44 includes a frame 44A having a space for storing the package C. For example, when the package C is carried by being stored in a box having a predetermined size, the frame 44A has such a size as to allow the box to be fixedly placed inside the frame 44A.

Further, the holder 44 also includes support members 44B configured to support the package C being carried so as to prevent the package C from falling down, and fixing members 44C having a known locking mechanism. When the package C is placed on the support members 44B, the fixing members 44C are closed to fix the package C so as to prevent the package C from moving in a horizontal direction. The support members 44B can be opened and closed by rotation of a motor (not shown), and when the unmanned aerial vehicle 40 lands at a carriage destination of the package C, the support members 44B are opened downward to cause the package C to fall down by about several centimeters so as to be able to place the package C on the ground.

It suffices that the holder 44 is a member capable of storing and fixing the package C, and the holder 44 is not limited to the above-mentioned example. For example, the holder 44 may have a catcher or an arm configured to fix the package C by sandwiching the package C in at least one of a left-right direction and an up-down direction, or may have a magnet configured to fix the package C by a magnetic force. In addition, for example, the holder 44 may have a storage container, a net, a bag, or the like configured to store the package C.

The reader 45 is a device configured to read a readable medium. The reader 45 is preferred to be able to read the readable medium in a non-contact manner (without being brought into contact with the readable medium), but a contact-type device may be applied. The readable medium is a medium including specific information, for example, a two-dimensional code, a bar code, or a radio frequency identifier (RFID) tag. In this embodiment, the readable medium is code information attached to the package C, and a two-dimensional code T is described as an example of the code information. Accordingly, the two-dimensional code T as used in this embodiment can be read as "code information" or "readable medium."

For example, the reader 45 is a code reader (scanner) configured to read the two-dimensional code T. The reader 45 includes a camera or an infrared sensor, and reads the two-dimensional code T based on an image picked up by the camera or a detection signal of the infrared sensor. As a method itself of detecting the two-dimensional code T, a method defined by the standard for the two-dimensional code T may be used.

The two-dimensional code T may be printed on a sticker, paper, or the like to be pasted to the package C, or may be printed directly on the package C. In addition, for example, when a liquid crystal display or an organic EL display is mounted on a surface of the package C, the two-dimensional code T may be displayed thereon. The two-dimensional code T may be attached at any position of the package C, but in this embodiment, the reader 45 is mounted to the unmanned aerial vehicle 40, and hence the two-dimensional code T is attached at such a position as to be easily read by the reader 45.

For example, a position at which the two-dimensional code T is to be attached to the package C is determined in advance, and a sender who is to ship the package C attaches the two-dimensional code T at a predetermined position on the package C. The reader 45 being a code reader is provided at such a position as to enable the reader 45 to read the two-dimensional code T attached at the above-mentioned position when the package C is held by the holder 44.

Figure 3:
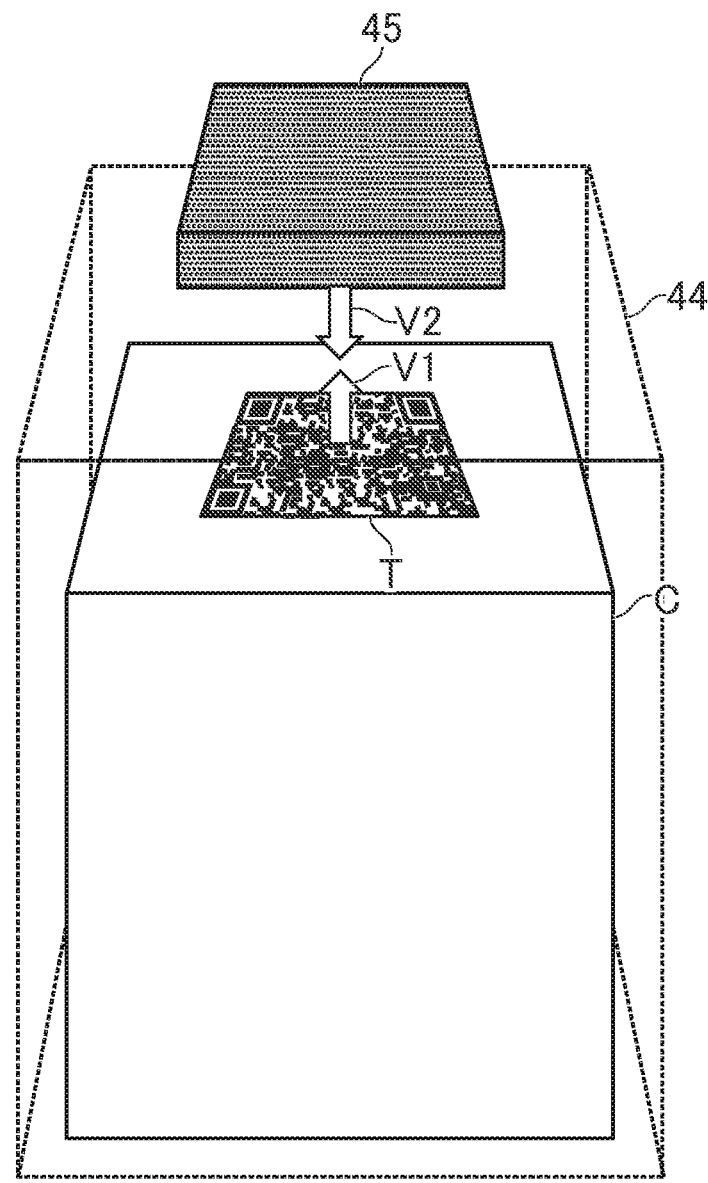
FIG. 3 is a diagram for illustrating a positional relationship between the reader and a two-dimensional code.

FIG. 3 is a diagram for illustrating a positional relationship between the reader 45 and the two-dimensional code T. In FIG. 3, a storage space in the holder 44 is indicated by the dotted lines. In this case, in order to facilitate viewing of the drawing, a gap is provided between the package C and the storage space. However, it is assumed that there is actually almost no gap so that the package C does not move while being carried.

As illustrated in FIG. 3, the reader 45 is provided so that the two-dimensional code T and the reader 45 face each other (are opposed each other) when the package C is held by the holder 44. In other words, the reader 45 is located at such a position as to cause an angle formed by a direction V1 of the two-dimensional code T and a direction V2 of the reader 45 to fall within a predetermined range (e.g., 145° or more and 180° or less). The direction V1 is the normal to the two-dimensional code T, and is a direction in which the printing surface of the two-dimensional code T faces. The direction V2 is a direction of a detection range of the reader 45, and is a direction in which the sensor is directed.

The reader 45 is arranged at a position on the direction V1 as viewed from the two-dimensional code T when the package C is stored inside the holder 44. In other words, the two-dimensional code T is arranged at a position on the direction V2 as viewed from the reader 45 when the package C is stored inside the holder 44. Consequently, when the package C is stored inside the holder 44, the two-dimensional code T is inevitably included in the detection range of the reader 45. That is, the reader 45 is provided so that the two-dimensional code T is included in the detection range when the package C is stored inside the holder 44. When the reader 45 and the two-dimensional code T are too close or too far, the reader 45 may not be able to read the two-dimensional code T, and hence the reader 45 is arranged at such a position as to cause a distance between the reader 45 and the two-dimensional code T to fall within a predetermined range (e.g., from 5 cm to 30 cm).

In this embodiment, the two-dimensional code T is attached in a central vicinity of an upper surface of the package C, and hence the reader 45 is arranged at such a position as to view the storage space of the package C in the holder 44 from directly above. In other words, the reader 45 is arranged on the bottom surface side of the unmanned aerial vehicle 40 and on a vertical center line of the storage space of the package C. Consequently, when the package C is stored in the holder 44, the two-dimensional code T of the package C is inevitably read by being included in the detection range of the reader 45.

The position at which the two-dimensional code T is to be attached is not limited to the central vicinity of the upper surface. It suffices that the position at which the two-dimensional code T is to be attached is determined based on a relative position of the reader 45 with respect to the storage space of the holder 44. For example, when the reader 45 is arranged at a position deviated from the vertical center line of the storage space of the holder 44, the two-dimensional code T may be attached at a position shifted from the center of the upper surface of the package C in the same direction as that of the arrangement position of the reader 45. Further, for example, when the reader 45 is arranged on a side surface of the holder 44, the two-dimensional code T is arranged on a side surface of the package C. Further, for example, when the reader 45 is arranged on a bottom surface of the holder 44, the two-dimensional code T is arranged on a bottom surface of the package C.

The two-dimensional code T may include any information, and in this embodiment, it is assumed that the two-dimensional code T includes package identification information. The package identification information is information for uniquely identifying the package C, and is, for example, a package ID assigned to the package C, a tracking number for tracking the package C, or an order ID of a product being the content of the package C. In this embodiment, a case in which the package ID corresponds to the package identification information is described. Accordingly, the package ID as used in this embodiment can be read as "package identification information."

The holder 44 holds the package C to which the two-dimensional code T including the package ID is attached, and the reader 45 reads the two-dimensional code T when the package C is held by the holder 44. The case in which the package C is held by the holder 44 may be after the storage of the package C is completed, or may be while the storage of the package C is being performed. For example, the reader 45 may be activated after the storage of the package C is completed and read the two-dimensional code T, or may be activated at all times and read the two-dimensional code T at any time of detecting the two-dimensional code T while the storage of the package C is being performed. In the following description, reference symbols of the two-dimensional code T and the package C are omitted.

Referring back to FIG. 1, the photographing device 46 includes at least one camera. For example, the photographing device 46 includes an image pickup element such as a CCD image sensor or a CMOS image sensor, and records an image picked up by the image pickup element as digital data. The image may be a still image or a moving image picked up continuously at a predetermined frame rate. The two-dimensional code T may be read through use of the photographing device 46.

The sensor group 47 includes at least one sensor, and includes a GPS sensor, for example. The GPS sensor includes a receiver configured to receive signals from satellites, and for example, detects positional information based on the signals received by the receiver. The positional information is, for example, latitude/longitude information or coordinate information, and may indicate, for example, a two-dimensional position on the ground or a three-dimensional position including an altitude as well.

The unmanned aerial vehicle 40 may mount any sensor, and the sensor group 47 may include any sensor such as an acceleration sensor, a gyro sensor, a wind sensor, a geomagnetic sensor, an altitude sensor, a displacement sensor, a pressure-sensitive sensor, an infrared sensor, a laser sensor, an ultrasonic sensor, or a temperature sensor. Further, the two-dimensional code T may be read through use of the sensor group 47.

The user terminal 50 is a computer to be operated by the user. For example, the user terminal 50 is, for example, a cell phone (including smartphone), a mobile information terminal (including tablet computer), or a personal computer. In this embodiment, the user terminal 50 includes a controller 51, a storage 52, a communicator 53, an operation device 54, and a display 55. The hardware configurations of the controller 51, the storage 52, and the communicator 53 may be similar to those of the controller 11, the storage 12, and the communicator 13.

The operation device 54 is an input device, and is, for example, a pointing device such as a touch panel or a mouse, a keyboard, or a button. The operation device 54 transfers details of operation by the user to the controller 51. The display 55 is a liquid crystal display or an organic EL display, for example. The display 55 displays a screen in accordance with an instruction from the controller 51.

The hardware configurations of the unmanned aerial vehicle management server 10, the flight route management server 20, the order management server 30, the unmanned aerial vehicle 40, and the user terminal 50 are not limited to the example of FIG. 1, and various kinds of hardware can be employed. For example, each of the devices may include a reading device (e.g., memory card slot or optical disc drive) configured to read a computer-readable information storage medium, or may include an input/output device (e.g., USB port) for communicating to/from an external device. Further, for example, a program and data described as being stored into each of the devices may be supplied via the reading device or the input/output device, or may be supplied via the network N.

2. Outline of Logistics System

In this embodiment, processing of the logistics system S is described by taking as an example a scene in which the unmanned aerial vehicle 40 carries a product ordered by a user as a package. For example, when a user operates the user terminal 50 to place an order for a product on the Internet, the user's order details are registered in the order management server 30, and an order completion screen is displayed on the display 55.

Figure 4:
FIG. 4 is a diagram for illustrating an example of an order completion screen.

FIG. 4 is a diagram for illustrating an example of the order completion screen. As illustrated in FIG. 4, on an order completion screen G1, there are displayed: information (e.g., product name and quantity) relating to the product ordered by the user; and carriage destination information and arrival time information that are designated by the user. In the example of FIG. 4, the carriage destination information is an address described as "delivery destination," and the arrival time information is a date/time described as "desired delivery time."

The carriage destination information is information indicating the carriage destination of the package, for example, an address, latitude/longitude information, or coordinate information on the carriage destination. The carriage destination is a place to which the package is to be carried, and is a place at which the package is to be received, or a place at which the package is to be delivered. In other words, the carriage destination can also be called a destination location, a flight destination, or a landing place of the unmanned aerial vehicle 40. The "carriage" means carrying a package, and can also be called transportation. In this embodiment, movement (flight) of the unmanned aerial vehicle 40 holding a package corresponds to the carriage.

The arrival time information can be a time at which the package is to arrive at the carriage destination, or can be a time at which the unmanned aerial vehicle 40 is to arrive at the carriage destination. For example, the arrival time information indicates a time at which the unmanned aerial vehicle 40 and the package are to arrive at the air above the carriage destination, a time at which the unmanned aerial vehicle 40 is to land at the carriage destination, or a time at which the package is to be placed at the carriage destination. The term "time" may indicate only a date, only a time or a time slot, or both thereof.

For example, when the user's order is completed, shop staff puts the product ordered by the user in a box having a predetermined size. The box in which the product is to be put may have a size capable of being stored in the holder 44 of the unmanned aerial vehicle 40, and in this embodiment, the box in which the product is packed is the package. In addition to the box, the product may be packed with, for example, a bag or any packing material including styrene foam. In addition, for example, the product may be carried as the package as it is without being particularly packed.

The order management server 30 transmits the two-dimensional code including the package ID to the terminal of the shop staff, and causes a shop printer to print the two-dimensional code on a sticker, a slip, or the like. The shop staff pastes the two-dimensional code in the central vicinity of the upper surface of the package, and moves to a departure location of the unmanned aerial vehicle 40. The departure location may be prepared within premises of the shop, or may be prepared at, for example, a delivery management center away from the shop. In the departure location, a dedicated port for the unmanned aerial vehicle 40 to take off and land may be prepared, or a parking lot, a vacant lot, or the like may be used instead of the dedicated place.

When the sender moves to the unmanned aerial vehicle 40, the sender stores the package in the holder 44 and closes the fixing members 44C. The reader 45 of the unmanned aerial vehicle 40 is activated in advance, and reads the two-dimensional code when the package is stored in the holder 44. The unmanned aerial vehicle 40 acquires the package ID included in the two-dimensional code, and transmits the acquired package ID together with the unmanned aerial vehicle identification information for uniquely identifying the own unmanned aerial vehicle 40.

The unmanned aerial vehicle identification information may be any information that can uniquely identify the unmanned aerial vehicle 40, and may be, for example, an unmanned aerial vehicle ID, a name, an individual identification information, or an IP address assigned by the unmanned aerial vehicle management system 1. In this embodiment, a case in which the unmanned aerial vehicle ID corresponds to the unmanned aerial vehicle identification information is described. Accordingly, the unmanned aerial vehicle ID as used in this embodiment can be read as "unmanned aerial vehicle identification information."

When the unmanned aerial vehicle management server 10 receives the unmanned aerial vehicle ID and the package ID, the unmanned aerial vehicle management server 10 manages those pieces of information in association with each other. This enables the unmanned aerial vehicle management server 10 to identify which unmanned aerial vehicle 40 is loaded with which package, and to use the information for tracking the package and respond to an inquiry from the user.

In this embodiment, the two-dimensional code does not include the carriage destination information and the arrival time information, and hence, when the unmanned aerial vehicle ID and the package ID are associated with each other, the unmanned aerial vehicle management server 10 transmits the received package ID to the order management server 30 to inquire about the carriage destination information and arrival time information. Then, the unmanned aerial vehicle management server 10 transmits the carriage destination information and the arrival time information that have been acquired from the order management server 30 to the flight route management server 20 to issue a request to generate flight plan information.

The flight plan information is information indicating a flight plan of the unmanned aerial vehicle 40, and includes at least flight route information. The flight route information indicates a route to be followed by the unmanned aerial vehicle 40, and may include, for example, information including a waypoint and the landing place or information indicating a place to evacuate in an emergency. The flight plan information may include information other than the flight route information, and in this embodiment, a case in which the flight plan information includes takeoff time information and estimated arrival time information is described.

The takeoff time information indicates a time at which the unmanned aerial vehicle 40 is to take off (depart). The estimated arrival time information indicates a time at which the unmanned aerial vehicle 40 is estimated to arrive at the carriage destination. The arrival time information indicates the time designated by the user, while the estimated arrival time information indicates the time calculated in consideration of an actual flight route or the like. When the estimated arrival time information is determined, the user terminal 50 is notified thereof, and an estimated arrival time screen is displayed on the display 55.

Figure 5:
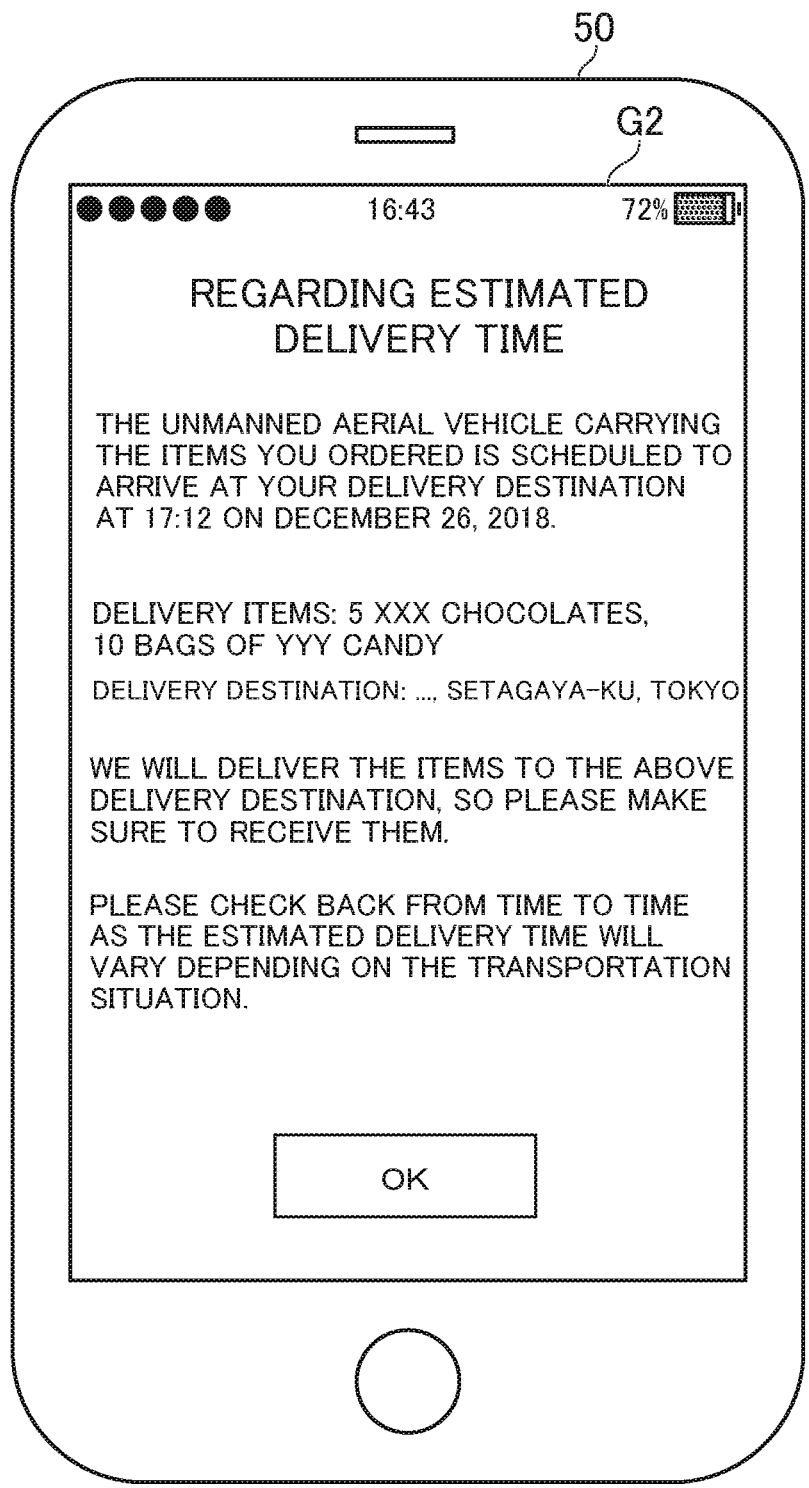
FIG. 5 is a diagram for illustrating an example of an estimated arrival time screen.

FIG. 5 is a diagram for illustrating an example of the estimated arrival time screen. As illustrated in FIG. 5, on an estimated arrival time screen G2, there are displayed information relating to the product ordered by the user, the carriage destination information designated by the user, and the estimated arrival time information. When it is possible to identify whether or not there is a landing place, for example, a port dedicated to landing, the landing place may be displayed on the estimated arrival time screen.

When the flight plan information is generated by the flight route management server 20, the unmanned aerial vehicle 40 autonomously flies from the departure location to the carriage destination based on the flight plan information. The term "autonomously" means that the computer mainly flies the unmanned aerial vehicle 40, and a human does not mainly fly the unmanned aerial vehicle 40. The term "autonomously" also includes a case in which an operation performed by the human is not considered at all, and a case in which the operation performed by the human is considered supplementarily. Instead of flying autonomously, the unmanned aerial vehicle 40 may be manually operated by an operator through use of a controller.

For example, the unmanned aerial vehicle 40 takes off from the departure location when a takeoff time indicated by the takeoff time information has been reached, and positional information and the like are transmitted between the unmanned aerial vehicle management server 10 and the unmanned aerial vehicle 40, to thereby achieve autonomous flight to the carriage destination indicated by the carriage destination information. Various kinds of methods can be applied as the autonomous flight itself, and for example, an autonomous flight algorithm using GPS may be used. Further, the autonomous flight algorithm is set in the unmanned aerial vehicle 40, and the unmanned aerial vehicle 40 may fly without particularly communicating to/from the unmanned aerial vehicle management server 10.

When the unmanned aerial vehicle 40 arrives at the air above the carriage destination, the unmanned aerial vehicle 40 starts a landing operation. After confirming the landing, the unmanned aerial vehicle 40 places the package on the ground and starts to return. The package may be taken out by the user instead of being automatically placed. When the unmanned aerial vehicle 40 returns by moving in a reverse direction on an outward flight route and arrives at the departure location, the carriage of the package is completed.

As described above, in the logistics system S according to this embodiment, when the package is stored in the holder 44 of the unmanned aerial vehicle 40, the reader 45 reads the two-dimensional code, and the unmanned aerial vehicle 40 transmits the package ID included in the two-dimensional code to the unmanned aerial vehicle management server 10 together with the unmanned aerial vehicle ID, to thereby enable the unmanned aerial vehicle management server 10 to manage the unmanned aerial vehicle ID and the package ID in association with each other. Now, details of this technology are described.

3. Functions to be Implemented in Logistics System

Figure 6:
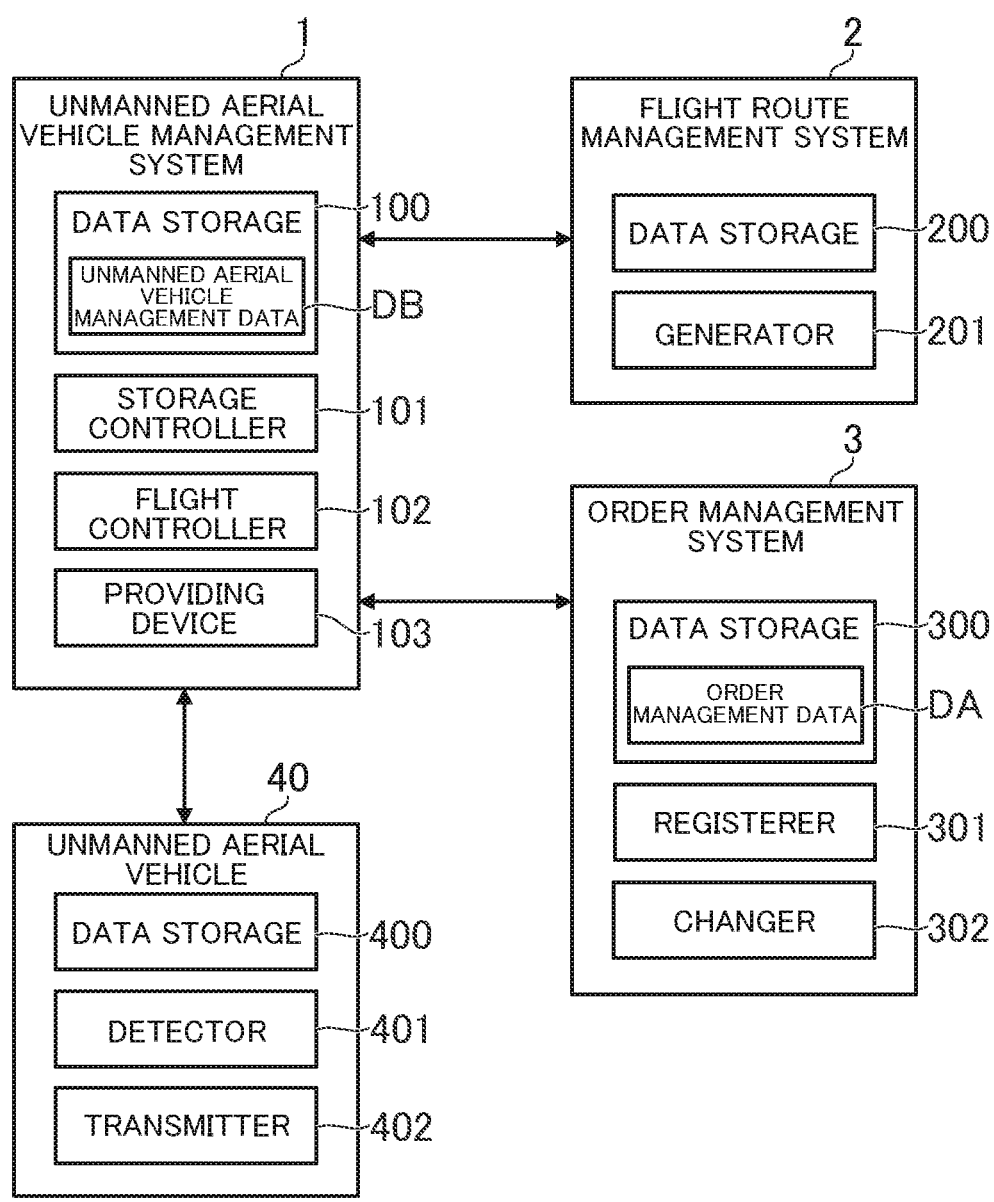
FIG. 6 is a functional block diagram for illustrating an example of functions to be implemented by the logistics system.

FIG. 6 is a functional block diagram for illustrating an example of functions to be implemented by the logistics system S. As illustrated in FIG. 6, functions to be implemented by each of the unmanned aerial vehicle management system 1, the flight route management system 2, the order management system 3, and the unmanned aerial vehicle 40 are described below.

[3-1. Functions to be Implemented in Unmanned Aerial Vehicle]

As illustrated in FIG. 6, in the unmanned aerial vehicle 40, a data storage 400, a detector 401, and a transmitter 402 are implemented. The data storage 400 is mainly implemented by the storage 42, and other functions are mainly implemented by the controller 41.

[Data Storage]

The data storage 400 is configured to store data required for the unmanned aerial vehicle 40 to carry the package. For example, the data storage 400 stores the unmanned aerial vehicle ID, information (package ID in this embodiment) included in the two-dimensional code read by the reader 45, and the flight plan information received from the unmanned aerial vehicle management system 1. Further, for example, the data storage 400 may store identification information (e.g., IP address, URL, server name, or email address, etc.) on the unmanned aerial vehicle management server 10, or the positional information detected by the detector 401 described later may be stored in chronological order.

[Detector]

The detector 401 is configured to detect the positional information on the unmanned aerial vehicle 40. Various kinds of methods can be applied as a method itself of detecting the positional information. For example, when a GPS signal is used, the detector 401 detects the positional information based on the GPS signal received by the sensor group 47. Further, for example, when the sensor group 47 includes a receiver of a GNSS signal other than the GPS signal, the detector 401 may detect the positional information based on the signal received by the receiver. Further, for example, the detector 401 may detect the positional information based on details of communication of the communicator 43, and may use information on, for example, a Wi-Fi access point or a cellular phone base station. Further, for example, the detector 401 may analyze an image picked up by the photographing device 46 to detect the positional information.

[Transmitter]

The transmitter 402 is configured to transmit the package ID and the unmanned aerial vehicle ID when the two-dimensional code is read by the reader 45. In this embodiment, the reader 45 is a code reader, and hence the transmitter 402 transmits the unmanned aerial vehicle ID and the package ID when the two-dimensional code is read by the code reader. In this embodiment, a case in which a transmission destination of those pieces of information is the unmanned aerial vehicle management server 10 is described, but the transmitter 402 may transmit the information to another computer, and for example, may transmit the information to the flight route management server 20 or the order management server 30, or may transmit the information to another computer.

In this embodiment, a case in which the transmitter 402 transmits the unmanned aerial vehicle ID and the package ID when the two-dimensional code is read by the reader 45 is described. However, the transmitter 402 may transmit the unmanned aerial vehicle ID and the package ID when the shop staff, the operator, or the like performs a predetermined operation after the two-dimensional code is read by the reader 45. In addition, for example, the transmitter 402 may transmit the package ID and the unmanned aerial vehicle ID when the transmitter 402 receives from the unmanned aerial vehicle management server 10 a request to transmit the package ID and the unmanned aerial vehicle ID.

For example, the transmitter 402 may further transmit the positional information detected by the detector 401 when the package is carried by the unmanned aerial vehicle 40. The transmitter 402 transmits the positional information in order for the unmanned aerial vehicle 40 to notify the unmanned aerial vehicle management system 1 of positional information on itself during flight. The detector 401 periodically acquires the latest positional information, and the transmitter 402 transmits the latest positional information. The unmanned aerial vehicle management system 1 receives the positional information and stores the positional information in an unmanned aerial vehicle management data DB described later, to thereby keep the positional information on the unmanned aerial vehicle 40 in the latest state and achieve autonomous flight control.

[3-2. Functions to be Implemented in Order Management System]

As illustrated in FIG. 6, in the order management system 3, a data storage 300, a registerer 301, and a changer 302 are implemented. The data storage 300 is mainly implemented by the storage 32, and other functions are mainly implemented by the controller 31.

[Data Storage]

The data storage 300 is configured to store data for managing the user's order. For example, the data storage 300 stores order management data DA in which various kinds of information relating to the product ordered by the user is to be stored.

FIG. 7 is a table for showing an example of data storage of the order management data DA. As shown in FIG. 7, the order management data DA stores the package ID, package information, user information, the unmanned aerial vehicle ID, the carriage destination information, the arrival time information, the landing place, the estimated arrival time information, and a status.

For example, each time the order management system 3 receives an order, the package ID is issued to create a new record in the order management data DA. It suffices that the package ID is issued based on a given ID issuance rule, and is issued so as to avoid overlapping with those of other orders. In this embodiment, one package is carried for one order, and hence the package ID can also be said to be information for identifying the order.

The package information is information indicating the content of the package. In this embodiment, the package includes the product, and hence the package information stores the information relating to the product ordered by the user. For example, the package information stores information including a product ID for uniquely identifying the product ordered by the user, a product name, a quantity, and a unit price. A database storing basic information on the product is stored in advance in the data storage 300, and the information including the product ID, the product name, and the unit price is acquired from the database.

The user information is information relating to the user who has ordered the product, and for example, stores information including a user ID for uniquely identifying the user, the user's name, and contact information. When the order management system 3 receives an order, the order management system 3 receives the user ID of the user who has placed the order from the user terminal 50, and stores the user information in the order management data DA. A database storing basic information on the user is stored in advance in the data storage 300, and the information including the user ID, the name, and the contact information is acquired from the database.

The unmanned aerial vehicle ID stored in the order management data DA is the unmanned aerial vehicle ID of the unmanned aerial vehicle 40 in charge of carrying the package indicated by the package ID of the same record. The carriage destination information and the arrival time information that are stored in the order management data DA are the carriage destination information and the arrival time information on the package indicated by the package ID of the same record. The landing place is a place at which the unmanned aerial vehicle 40 is to land at the carriage destination of the package, and is, for example, a port dedicated to takeoff and landing.

The estimated arrival time information stored in the order management data DA is the estimated arrival time information on the package indicated by the package ID of the same record. The status is the current status of the unmanned aerial vehicle 40 or the package, and for example, a plurality of statuses including "before takeoff," "carrying," or "carriage completed" are prepared.

[Registerer]

The registerer 301 is configured to register the package ID and at least one of the carriage destination information and the arrival time information in association with each other. In this embodiment, a case in which the registerer 301 registers both the carriage destination information and the arrival time information is described, but the registerer 301 may register only one of the carriage destination information and the arrival time information. The term "registration" is to record information in the data storage 300. The term "register in association with each other" is to link pieces of information to each other, to register pieces of information in a manner searchable for each other, to store pieces of information in the same record, or to enable another piece of information to be retrieved with one piece of information being used as a key.

In this embodiment, the order management system 3 issues the package ID by itself and receives the carriage destination information and the arrival time information from the user terminal 50, and hence the registerer 301 registers the issued package ID and the received carriage destination information and arrival time information in association with each other. The user may register the carriage destination information in the data storage 300 in advance, or may register a plurality of pieces of carriage destination information and make a selection therefrom at the time of placing an order. In addition, for example, the carriage destination information may be input by the user from the user terminal 50. The arrival time information may be input by the user from the user terminal 50, or may be selected by the user from the dates/times at which the unmanned aerial vehicle 40 can arrive in consideration of a reservation situation of the unmanned aerial vehicle 40.

In this embodiment, the package carried by the unmanned aerial vehicle 40 is the product ordered by the user, and hence a case in which the registerer 301 is implemented by the order management system 3 configured to manage the order of the product is described, but the registerer 301 may be implemented by a system (e.g., unmanned aerial vehicle management system 1 or flight route management system 2) other than the order management system 3.

[Changer]

The changer 302 is configured to change at least one of the carriage destination information and the arrival time information registered by the registerer 301. In this embodiment, the changer 302 can change both the carriage destination information and the arrival time information, but may be capable of changing only one of the carriage destination information and the arrival time information.

For example, it is assumed that the user can perform an operation for changing the carriage destination information and the arrival time information from the user terminal 50 at any timing after the order has been placed. The user designates the package ID from the user's own order history, and then inputs the carriage destination information and the arrival time information that have been changed. The user terminal 50 transmits, to the order management server 30, the carriage destination information and the arrival time information that have been changed and the designated package ID, and the changer 302 changes the carriage destination information and the arrival time information that are associated with the received package ID. The carriage destination information and the arrival time information may be changed by another person, for example, the shop staff.

[3-3. Functions to be Implemented in Unmanned Aerial Vehicle Management System]

As illustrated in FIG. 6, in the unmanned aerial vehicle management system 1, a data storage 100, a storage controller 101, a flight controller 102, and a providing device 103 are implemented. The data storage 100 is mainly implemented by the storage 12, and other functions are mainly implemented by the controller 11.

[Data Storage]

The data storage 100 is configured to store data required for managing the unmanned aerial vehicle 40. For example, the data storage 100 stores the unmanned aerial vehicle management data DB in which various kinds of information relating to the unmanned aerial vehicle 40 to be managed are stored.

FIG. 8 is a table for showing an example of data storage of the unmanned aerial vehicle management data DB. As shown in FIG. 8, for example, the unmanned aerial vehicle management data DB stores the unmanned aerial vehicle ID, vehicle body information, the package ID, the carriage destination information, the arrival time information, the flight plan information, and carrying situation.

The unmanned aerial vehicle ID stored in the unmanned aerial vehicle management data DB is the unmanned aerial vehicle ID of the unmanned aerial vehicle 40 to be managed by the unmanned aerial vehicle management system 1. The unmanned aerial vehicle ID is input in advance by, for example, an administrator, to be stored in the unmanned aerial vehicle management data DB. The vehicle body information is information relating to a vehicle body of the unmanned aerial vehicle 40. For example, the vehicle body information includes various kinds of information, namely, a manufacturer, a model, a size, a weight, fuel efficiency, and battery performance, of the unmanned aerial vehicle 40.

The package ID stored in the unmanned aerial vehicle management data DB is the package ID of the package carried by the unmanned aerial vehicle 40 indicated by the unmanned aerial vehicle ID stored in the same record. The package ID is transmitted by the transmitter 402 of the unmanned aerial vehicle 40. The carriage destination information and the arrival time information stored in the unmanned aerial vehicle management data DB are the carriage destination information and the arrival time information on the package carried by the unmanned aerial vehicle 40 indicated by the unmanned aerial vehicle ID stored in the same record.

The flight plan information stored in the unmanned aerial vehicle management data DB is the flight plan information set in the unmanned aerial vehicle 40 indicated by the unmanned aerial vehicle ID stored in the same record. The carrying situation includes, for example, the current positional information and the status of the unmanned aerial vehicle 40 indicated by the unmanned aerial vehicle ID stored in the same record. As described above, the positional information on the unmanned aerial vehicle 40 is kept in the latest state in the unmanned aerial vehicle management system 1, and hence the positional information stored in the unmanned aerial vehicle management data DB becomes the latest positional information.

[Storage Controller]

The storage controller 101 is configured to store the package ID and the unmanned aerial vehicle ID, which have been transmitted by the transmitter, in the data storage 100 in association with each other. The term "store in association with each other" is to link pieces of information to each other, to register pieces of information in a manner searchable for each other, to store pieces of information in the same record, or to enable another piece of information to be retrieved with one piece of information being used as a key.

For example, when the package ID and the unmanned aerial vehicle ID are received from the unmanned aerial vehicle 40, the storage controller 101 stores the package ID in the record in which the unmanned aerial vehicle ID is stored, to thereby store the package ID and the unmanned aerial vehicle ID in the data storage 100 in association with each other. When the package ID is already stored in the record, the storage controller 101 overwrites the stored package ID with the received package ID.

In this embodiment, the storage controller 101 further stores the positional information transmitted by the transmitter in the data storage 100. The unmanned aerial vehicle 40 repeatedly detects the positional information by the sensor group 47, and transmits the detected positional information to the unmanned aerial vehicle management server 10 together with its own unmanned aerial vehicle ID. The storage controller 101 stores the positional information in the record in which the unmanned aerial vehicle ID is stored in the unmanned aerial vehicle management data DB. This keeps the positional information in the latest state.

[Flight Controller]

The flight controller 102 is configured to fly the unmanned aerial vehicle 40 based on the flight plan information. In this embodiment, the flight controller 102 is implemented by the unmanned aerial vehicle management system 1, and hence the flight controller 102 transmits a control signal based on the flight plan information to the unmanned aerial vehicle 40. The control signal may have any content, for example, a takeoff instruction, a landing instruction, a hovering instruction, a direction instruction, an acceleration instruction, a deceleration instruction, or a turning instruction.

For example, the flight controller 102 flies the unmanned aerial vehicle 40 by transmitting the flight plan information to the unmanned aerial vehicle 40. For example, the flight controller 102 acquires the current date/time through use of a real-time clock, a GPS signal, or the like to determine whether or not the takeoff time has been reached. When the flight controller 102 determines that the takeoff time has been reached, the flight controller 102 transmits the takeoff instruction to the unmanned aerial vehicle 40. When the unmanned aerial vehicle 40 receives the takeoff instruction, the unmanned aerial vehicle 40 increases the number of revolutions of its propeller to take off from the departure location.

When the flight controller 102 receives a notification of the completion of the takeoff from the unmanned aerial vehicle 40, the flight controller 102 changes, to "carrying," the status associated with the unmanned aerial vehicle ID of the unmanned aerial vehicle to which the takeoff instruction has been transmitted. After that, the flight controller 102 transmits the control signal to the unmanned aerial vehicle 40 so as to cause the unmanned aerial vehicle 40 to fly on the flight route based on the positional information and the flight plan information that are stored in the unmanned aerial vehicle management data DB, to thereby achieve the autonomous flight to the carriage destination. For example, the flight controller 102 transmits the landing instruction when the unmanned aerial vehicle 40 arrives at the carriage destination. When the unmanned aerial vehicle 40 receives the landing instruction, the unmanned aerial vehicle 40 starts the landing operation, and when the landing is completed, the unmanned aerial vehicle 40 opens the frame 44A to drop the package and starts to take off. After that, the unmanned aerial vehicle 40 follows back the flight route to return to the departure location. The flight control on a return route is the same as the flight control on the outward route.

[Providing Device]

The providing device 103 is configured to provide, when the package ID is designated by the user, the carrying situation of the package indicated by the designated package ID to the user based on the positional information associated with the designated package ID. The carrying situation is tracking information on the package, for example, the current status, the current position, and the estimated arrival time information on the unmanned aerial vehicle 40 and the package. The providing device 103 provides the carrying situation of the package to the user through use of an application, a web browser, electronic mail, or the like stored in the user terminal 50.

[3-4. Functions to be Implemented in Flight Route Management System]

As illustrated in FIG. 6, in the flight route management system 2, a data storage 200 and a generator 201 are implemented. The data storage 200 is mainly implemented by the storage 22, and the generator 201 is mainly implemented by the controller 21.

[Data Storage]

The data storage 200 is configured to generate data for managing the flight route. For example, the data storage 200 stores an algorithm for calculating the flight route. In this embodiment, the departure location of the unmanned aerial vehicle 40 is determined in advance, and the data storage 200 stores the positional information on the departure location. Further, for example, the data storage 200 may store information relating to the landing place, and may also store presence or absence of a takeoff/landing port for each carriage destination.

[Generator]

The generator 201 is configured to generate the flight plan information for the unmanned aerial vehicle 40 based on the information included in the two-dimensional code when the two-dimensional code is read by the reader 45. In this embodiment, the two-dimensional code includes only the package ID, and hence the generator 201 generates the flight plan information based on the package ID included in the two-dimensional code. In this embodiment, the flight plan information includes the landing place, the flight route, scheduled takeoff time information, and the estimated arrival time information, and hence the generator 201 generates those pieces of information.

For example, the generator 201 generates the flight plan information based on at least one of the carriage destination information and the arrival time information that are associated with the package ID transmitted by the transmitter. In this embodiment, a case in which the generator 201 generates the flight plan information based on both the carriage destination information and the arrival time information is described, but the generator 201 may generate the flight plan information based on any one of the carriage destination information and the arrival time information. The generator 201 generates the flight plan information based on the carriage destination information and the arrival time information that are associated with the package ID in the unmanned aerial vehicle management data DB.

For example, the data storage 200 stores information relating to the landing place for each carriage destination, and hence the generator 201 identifies the landing place at the carriage destination based on the carriage destination information. Further, for example, the generator 201 determines the flight route based on the departure location stored in the data storage 200 and the carriage destination indicated by the carriage destination information. The flight route may be determined through use of a predetermined route search algorithm such as a Dijkstra's algorithm or an A-star method based on the departure location and the destination location, or may simply be a straight line connecting the departure location and the destination location.

Further, for example, the generator 201 determines the scheduled takeoff time information and the estimated arrival time information so that the unmanned aerial vehicle 40 arrives at a time indicated by the arrival time information. The generator 201 determines a time of flight based on the flight route and a standard speed of the unmanned aerial vehicle 40, and determines the scheduled takeoff time information and the estimated arrival time information so that the unmanned aerial vehicle 40 arrives at the carriage destination at a time indicated by the arrival time information or within a predetermined time period before and after the time. In addition, for example, the generator 201 may determine the scheduled takeoff time information in consideration of a use status or the like of the unmanned aerial vehicle 40. The generator 201 generates the flight plan information including each piece of information determined in the above-mentioned manner.

In this embodiment, there is a possibility that the carriage destination information and the arrival time information may be changed by the changer, and hence when the package ID is transmitted by the transmitter after a change is made by the changer, the generator 201 generates the flight plan information based on the carriage destination information and the arrival time information that have been changed by the changer. That is, when the flight plan information is to be generated, the generator 201 refers to the latest carriage destination information and arrival time information that have been changed instead of the old carriage destination information and arrival time information. The method itself of generating the flight plan information is as described above.

In this embodiment, the generator 201 is implemented by the flight route management system 2 different from the order management system 3, and inquires the carriage destination information and the arrival time information from the order management system 3. The inquiry includes the package ID of the package for which the flight plan information is to be calculated, and the order management system 3 refers to the order management data DA to transmit the carriage destination information and the arrival time information that are associated with the package ID. The generator 201 may be implemented by the unmanned aerial vehicle management system 1.

4. Processing to be Executed in Logistics System

Figure 9:
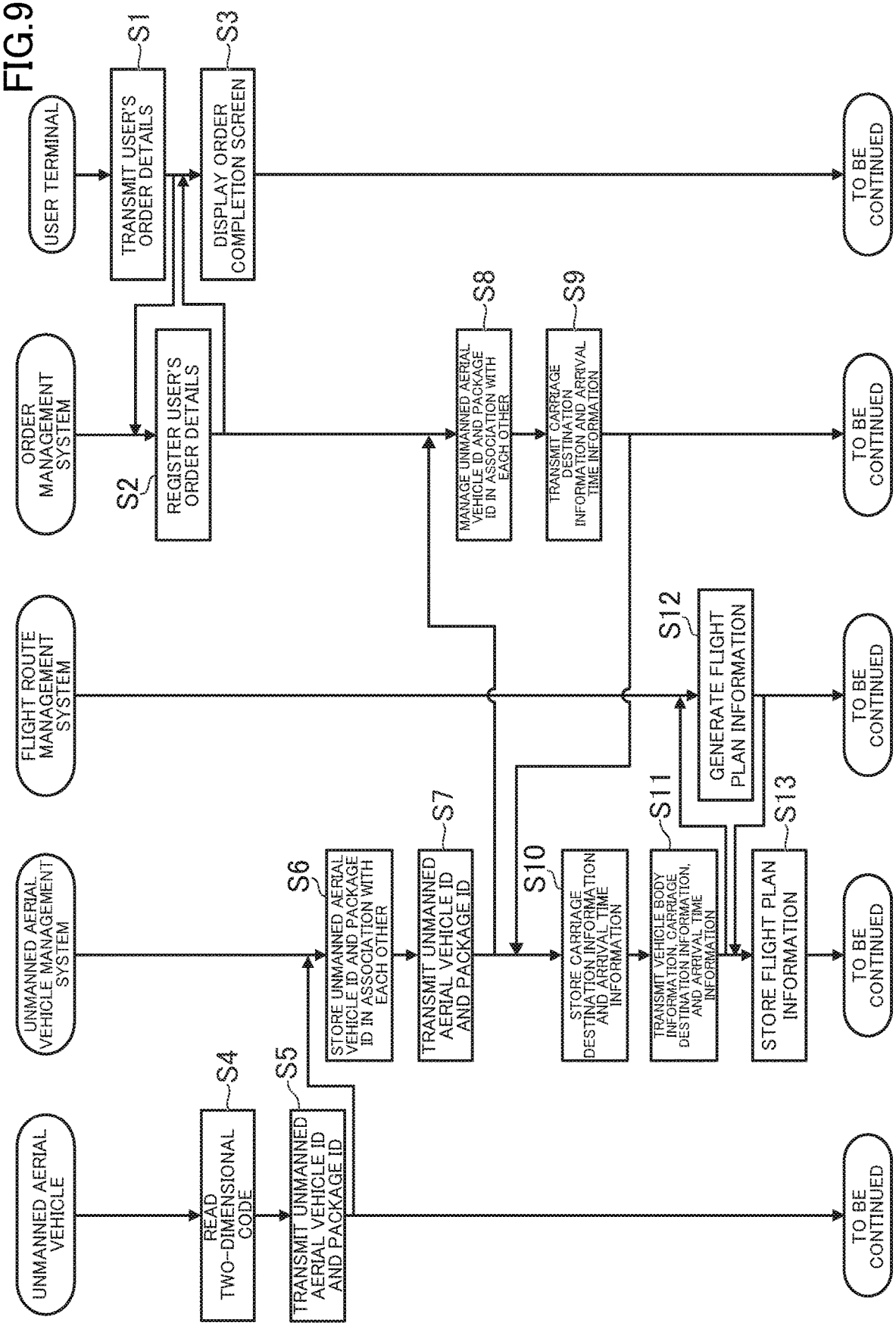
FIG. 9 is a flow chart for illustrating an example of processing to be executed in the logistics system.
Figure 10:
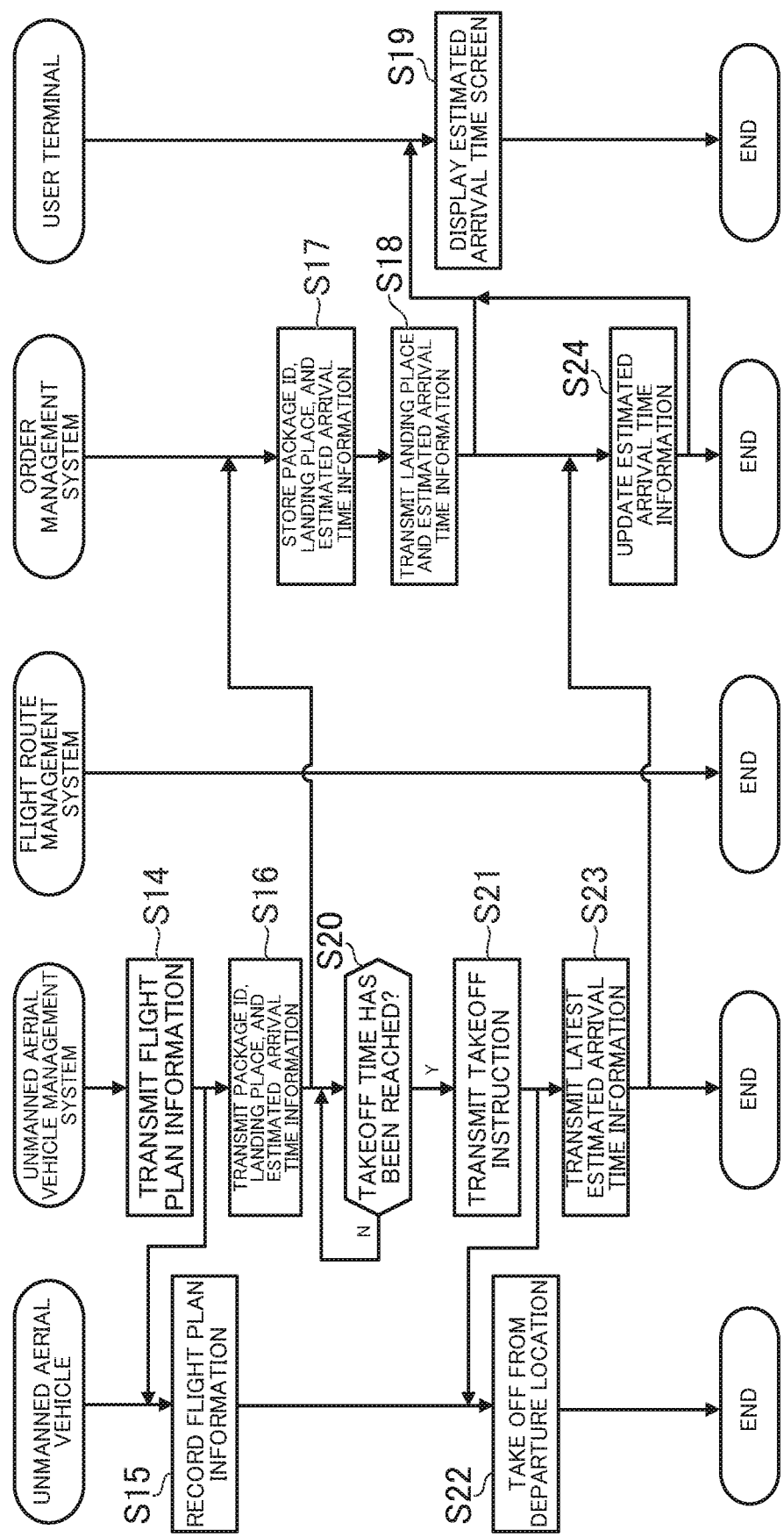
FIG. 10 is a flow chart for illustrating the example of the processing to be executed in the logistics system.

FIG. 9 and FIG. 10 are flow charts for illustrating an example of processing to be executed in the logistics system S. The processing illustrated in FIG. 9 and FIG. 10 is executed by the controllers 11, 21, 31, 41, and 51 operating in accordance with programs stored in the storages 12, 22, 32, 42, and 52, respectively. The processing described below is an example of processing of the functional blocks illustrated in FIG. 6.

As illustrated in FIG. 9, first, in the user terminal 50, when the user orders a product sold on the Internet, the controller 51 transmits the user's order details to the order management system 3 (Step S1). In Step S1, the controller 51 transmits the product ID, the quantity, the carriage destination information, and the arrival time information of the product ordered by the user together with the user ID stored in the storage 52.

In the order management system 3, when the order details are received, the controller 31 registers the user's order details in the order management data DA (Step S2). In Step S2, the controller 31 issues the package ID based on a predetermined ID issuance rule. The controller 31 creates a new record in the order management data DA, and stores the issued package ID, the package information including the product ID and the quantity of the product ordered by the user, the user information including the user ID of the user who has placed the order, the carriage destination information designated by the user, and the arrival time information designated by the user. At this time point, it is not determined which unmanned aerial vehicle 40 is in charge of the carriage, and hence the unmanned aerial vehicle ID is not stored. In addition, the flight route information has not been determined, and hence the landing place, the estimated arrival time information, and the status are not stored.

The user terminal 50 receives, from the order management system 3, a notification that the order has been received, and the controller 51 displays the order completion screen G1 on the display 55 (Step S3). After that, the user waits for the product to be shipped. The shop staff operates the shop terminal to access the order management data DA and confirm the user's order details. Then, the shop staff packs the product in a box to create a package, prints the two-dimensional code indicating the package ID stored in the order management data DA by the shop printer, and pastes the two-dimensional code in the central vicinity of the upper surface of the package. The shop staff stores, in the holder 44 of the unmanned aerial vehicle 40, the package to which the two-dimensional code is pasted.

In the unmanned aerial vehicle 40, the reader 45 reads the two-dimensional code on the package (Step S4). In Step S4, the reader 45 analyzes the image, the detection result of the sensor, and the like through use of a method defined by the standard of the two-dimensional code, and acquires the package ID included in the two-dimensional code.

The controller 41 transmits, to the unmanned aerial vehicle management system 1, the package ID of the two-dimensional code read in Step S4 together with the unmanned aerial vehicle ID stored in the storage 42 (Step S5). The information including the IP address and the email address of the unmanned aerial vehicle management server 10 is stored in advance in the storage 42, and the controller 41 transmits the unmanned aerial vehicle ID and the package ID based on the information.

In the unmanned aerial vehicle management system 1, when the unmanned aerial vehicle ID and the package ID are received, the controller 11 stores the received unmanned aerial vehicle ID and package ID in the unmanned aerial vehicle management data DB in association with each other (Step S6). In Step S6, the controller 11 refers to the unmanned aerial vehicle management data DB to identify a record in which the received unmanned aerial vehicle ID is stored, and stores the package ID in the record. Thus, in the unmanned aerial vehicle management system 1, the unmanned aerial vehicle ID and the package ID are stored in association with each other.

The controller 11 transmits, to the order management system 3, the unmanned aerial vehicle ID and the package ID that have been received in Step S6 (Step S7). In Step S7, the controller requests the order management system 3 to associate the unmanned aerial vehicle ID and the package ID with each other. When it is not required to associate those pieces of information in the order management system 3, the processing of Step S7 may be omitted.

In the order management system 3, when the unmanned aerial vehicle ID and the package ID are received, the controller 31 manages the received unmanned aerial vehicle ID and package ID in the order management data DA in association with each other (Step S8). In Step S8, the controller 11 refers to the order management data DA to identify a record in which the received package ID is stored, and stores the unmanned aerial vehicle ID in the record. Thus, in the order management system 3, the unmanned aerial vehicle ID and the package ID are managed in association with each other.

The controller 31 transmits, to the unmanned aerial vehicle management system 1, the carriage destination information and the arrival time information that are associated with the package ID received in Step S8 (Step S9). In Step S9, the controller 31 acquires and transmits the carriage destination information and the arrival time information that are stored in the record in which the received package ID is stored.

In the unmanned aerial vehicle management system 1, when the carriage destination information and the arrival time information are received, the controller 11 stores the received carriage destination information and arrival time information in the unmanned aerial vehicle management data DB (Step S10). In Step S10, the controller 11 stores the carriage destination information and the arrival time information in the record identified in Step S6. Thus, the carriage destination information and the arrival time information are managed in association with the package ID received in Step S6.

The controller 11 transmits, to the flight route management system 2, the carriage destination information and the arrival time information that have been received in Step S10 and the vehicle body information on the unmanned aerial vehicle 40 (Step S11). In Step S11, the controller 11 acquires the vehicle body information stored in the record identified in Step S6, and requests the flight route management system 2 to generate the flight plan information. In the case of generating the flight plan information, the transmission of the vehicle body information is omitted when the vehicle body information is not particularly taken into consideration.

In the flight route management system 2, when the vehicle body information and the like are received, the controller 21 generates the flight plan information (Step S12). In this case, it is assumed that the departure location of the unmanned aerial vehicle 40 is fixed and departure location information is stored in advance in the storage 22. In Step S12, the controller 21 determines the flight route based on the departure location information and the carriage destination information. The flight route may be a route connecting the departure location and the carriage destination by a straight line, or may be a route calculated through use of a known route search algorithm. The controller 21 determines the scheduled takeoff time information and the estimated arrival time information based on the flight route and the vehicle body information. In addition, the controller 21 acquires the landing place associated with the carriage destination information. The controller 21 generates the flight plan information including the above-mentioned landing place, flight route, scheduled takeoff time information, and estimated arrival time information, and transmits the flight plan information to the unmanned aerial vehicle management system 1.

In the unmanned aerial vehicle management system 1, when the flight plan information is received, the controller 11 stores the received flight plan information in the unmanned aerial vehicle management data DB (Step S13). In Step S13, the controller 11 stores the received flight plan information in the record identified in Step S6.

Referring next to FIG. 10, the controller 11 transmits the flight plan information received in Step S13 to the unmanned aerial vehicle 40 (Step S14), and transmits the package ID, the landing place, and the estimated arrival time information to the order management system 3 (Step S15). In Step S14, the controller 11 requests the unmanned aerial vehicle 40 to register the flight plan information. In Step S15, the controller 11 requests the order management system 3 to update the information related to the carrying situation.

In the unmanned aerial vehicle 40, when the flight plan information is received, the controller 41 records the received flight plan information in the storage 42 (Step S16). The unmanned aerial vehicle 40 may receive an instruction required for the flight from the unmanned aerial vehicle management system 1 as required without particularly storing the flight plan information.

In the order management system 3, when the package ID or the like is received, the controller 31 stores the received package ID, landing place, and estimated arrival time information in the order management data DA (Step S17). When the order management system 3 does not particularly manage the carrying situation of the unmanned aerial vehicle 40, the processing of Step S17 may be omitted.

The controller 31 transmits the landing place and the estimated arrival time information to the user terminal 50 (Step S18). In the user terminal 50, when the landing place and the estimated arrival time information are received, the controller 51 displays, on the display 55, the estimated arrival time screen G2 for presenting the received landing place and the estimated arrival time information (Step S19).

In the unmanned aerial vehicle management system 1, the controller 11 determines whether or not the takeoff time has been reached based on the flight plan information (Step S20). In Step S20, the controller 11 acquires the current date/time through use of a real-time clock, a GPS signal, or the like to determine whether or not the takeoff time indicated by the scheduled takeoff time information has been reached.

When it is not determined that the takeoff time has been reached (Step S20: N), the takeoff instruction is not transmitted, and the unmanned aerial vehicle 40 waits for takeoff. Meanwhile, when it is determined that the takeoff time has been reached (Step S20: Y), the controller 11 transmits the takeoff instruction to the unmanned aerial vehicle 40 (Step S21). The takeoff instruction may be executed by transmitting information having a predetermined format.

In the unmanned aerial vehicle 40, when the takeoff instruction is received, the controller 41 takes off from the departure location and starts to fly based on the flight plan information (Step S22). After that, the autonomous flight to the carriage destination is controlled between the unmanned aerial vehicle management system 1 and the unmanned aerial vehicle 40.

In the unmanned aerial vehicle management system 1, the controller 11 calculates the latest estimated arrival time information based on the unmanned aerial vehicle management data DB, and transmits the latest estimated arrival time information to the order management system 3 together with the package ID (Step S23).

In the order management system 3, when the package ID and the estimated arrival time information are received, the controller 31 updates the estimated arrival time information stored in the order management data DA (Step S24), and transmits the latest estimated arrival time to the user terminal 50 (Step S25). In the user terminal 50, when the estimated arrival time information is received, the procedure advances to the processing of Step S19, and the estimated arrival time screen G2 is displayed. After that, the processing procedures of Step S23 to Step S25 are executed while the unmanned aerial vehicle 40 carries the package to the carriage destination until the unmanned aerial vehicle 40 lands at the carriage destination. When the unmanned aerial vehicle 40 lands at the carriage destination, the unmanned aerial vehicle 40 drops the package and takes off again to return to the departure location, and this processing is finished.

According to the logistics system S of the first embodiment, when the package is held by the holder 44 of the unmanned aerial vehicle 40, the two-dimensional code is read by the reader 45, and the package ID and the unmanned aerial vehicle ID that are included in the two-dimensional code are stored in the unmanned aerial vehicle management data DB in association with each other, and hence it is possible to easily manage the package carried by the unmanned aerial vehicle 40. That is, when the package is stored in the unmanned aerial vehicle 40 to be physically associated therewith, the package and the unmanned aerial vehicle 40 can also be electronically associated with each other. In addition, the package ID and the unmanned aerial vehicle ID are associated with each other, to thereby be able to easily identify which package is stored in which unmanned aerial vehicle 40. For example, even when a wrong package is stored in the unmanned aerial vehicle 40, it is possible to immediately notice that fact, to thereby prevent erroneous delivery. Further, for example, even when a trouble occurs in the unmanned aerial vehicle 40 carrying the package, it is possible to easily identify which package is having the trouble in carriage.

Further, when the two-dimensional code is read by the reader 45 of the unmanned aerial vehicle 40, the flight plan information is generated based on the information included in the two-dimensional code, and hence the operator is no longer required to input the carriage destination information or the like in the case of generating the flight plan information, to thereby be able to save the time and labor in the case of carrying the package by the unmanned aerial vehicle 40. In addition, the flight plan information is automatically generated by reading the two-dimensional code, and hence it is possible to generate the flight plan information more quickly, to thereby carry the package faster.

Further, the package ID, the carriage destination information, and the arrival time information are registered in the order management system 3 in association with each other, and the flight plan information is generated based on the registered details, and hence it is not required to include the carriage destination information and the arrival time information in the two-dimensional code, to thereby reduce the amount of data of the two-dimensional code. Further, when erroneous carriage destination information and arrival time information are acquired due to, for example, erroneous detection of the reader 45, the erroneous delivery or delivery delay is caused, but it is possible to prevent the erroneous delivery and the delivery delay through use of the carriage destination information and the arrival time information that are managed by the system side. Further, it is no longer required to bother to input the carriage destination information and the arrival time information to the unmanned aerial vehicle 40, and hence the restriction of the unmanned aerial vehicle 40 to be imposed at the time of carrying the package is eliminated, to thereby enable efficient delivery.

Further, when the carriage destination information and the arrival time information are changed, the flight plan information is generated based on the carriage destination information and the arrival time information that have been changed, to thereby be able to prevent the erroneous delivery and the delivery delay due to the old carriage destination information and arrival time information. Further, with a method of including the carriage destination information and the arrival time information in the two-dimensional code, it is not possible to handle the change of the carriage destination information and the arrival time information made after the two-dimensional code is printed, but such a case can be handled flexibly.

Further, the carriage destination information and the arrival time information are managed in the order management system 3, and the flight plan information is generated through use of the carriage destination information and the arrival time information. Thus, the user can generate the flight plan information based on the carriage destination information and the arrival time information that are designated at the time of ordering the product, to thereby be able to improve the convenience of the user.

Further, when the package is being carried by the unmanned aerial vehicle 40, the latest positional information is transmitted to the unmanned aerial vehicle management system 1, to thereby enable the unmanned aerial vehicle management system 1 side to manage the latest positional information at all times.

Further, when the carrying situation of the package based on the latest positional information detected by the unmanned aerial vehicle 40 is provided to the user terminal 50, the user can know the real-time position or the like of the unmanned aerial vehicle 40, and hence it is possible to enhance the convenience of the user.

Further, the two-dimensional code attached to the package and the code reader are used, to thereby be able to acquire the package ID based on a method with which the package ID can be detected relatively easily, and hence it is possible to reliably acquire the package ID.

Further, when the package is stored in the holder 44, the reader 45 being a code reader can acquire the package ID included in the two-dimensional code through a series of operations for putting the package in the holder 44 by causing the two-dimensional code attached to the package to face the reader 45.

5. Modification Examples

The one or more embodiments of the present invention is not limited to the embodiment described above, and can be modified suitably without departing from the spirit of the one or more embodiments of the present invention.

(1) For example, the unmanned aerial vehicle 40 may change a flight method depending on the type of the package. The unmanned aerial vehicle 40 may decrease a moving speed in order to suppress vibration when carrying fragile goods, carbonated drinks, or the like in the package, and may increase the moving speed for earlier arrival when carrying soft goods or the like in the package.

The registerer 301 in this modification example further registers package type information in association with the package ID. The package type information is the type of the content of the package, for example, the type of the product indicated by the product ID stored in the package information of the order management data DA. When products are categorized in advance, the package type information may be a category associated with the product. Further, for example, the package type information may be designated by the administrator of the order management system 3. The package type information is stored in the order management data DA.

For example, the generator 201 generates the flight plan information based further on the package type information associated with the package ID transmitted by the transmitter 402. In this modification example, it is assumed that a relationship between the type of the package and the flight plan information is defined in a flight plan algorithm stored in the data storage 200. For example, when the package type information is the specific type such as fragile goods or carbonated drinks, the generator 201 sets the moving speed of the unmanned aerial vehicle 40 lower and the takeoff time earlier than when the package type information is not the specific type.

Further, for example, when the package type information is the specific type, the generator 201 determines the flight route of the unmanned aerial vehicle 40 so that the unmanned aerial vehicle 40 is to pass through places in which the wind is relatively weaker than when the package type information is not the specific type. Further, for example, when the package type information is the specific type, the generator 201 determines the flight route of the unmanned aerial vehicle 40 so that the unmanned aerial vehicle 40 is to pass through low altitudes at which the unmanned aerial vehicle 40 is less likely to be affected by the wind than when the package type information is not the specific type. Further, for example, when the package type information is the specific type, the generator 201 may generate flight plan information so as to reduce vibration and impact during the takeoff and the landing.

According to Modification Example (1), the flight plan information is generated in consideration of the package type information, to thereby be able to set optimum flight plan information corresponding to the type of the package. As a result, it is possible to safely carry the package supposed to be carefully handled in terms of vibration and impact, for example, the package of fragile goods, carbonated drinks, or the like.

(2) Further, for example, in the embodiment, the case in which the departure location of the unmanned aerial vehicle 40 is fixed and the flight route management system 2 stores the departure location of the unmanned aerial vehicle 40 has been described. However, the unmanned aerial vehicle management system 1 may store the departure location of the unmanned aerial vehicle 40. Further, for example, the departure location may be determined based on the latest positional information on the unmanned aerial vehicle 40 obtained when the flight plan information is generated.

The generator 201 in this modification example generates flight plan information based further on the positional information transmitted by the transmitter 402. The generator 201 acquires the positional information transmitted by the transmitter 402 as the departure location of the unmanned aerial vehicle 40, and generates flight plan information. The method itself of generating the flight plan information is as described in the embodiment.

According to Modification Example (2), the flight plan information is generated by determining the departure location based on the positional information detected by the unmanned aerial vehicle 40, to thereby be able to reliably generate the flight plan information no matter where the unmanned aerial vehicle 40 is located. As a result, there are no restrictions imposed on the departure location of the unmanned aerial vehicle 40, and carriage can be performed more efficiently.

(3) Further, for example, in the embodiment, the case in which the two-dimensional code includes only the package ID and the carriage destination information and the arrival time information on the package are acquired from the order management system 3 has been described. However, those pieces of information may be included in the two-dimensional code.

The two-dimensional code in this modification example includes at least one of the carriage destination information and the arrival time information. In this case, the case in which the two-dimensional code includes both the carriage destination information and the arrival time information has been described, but only one of the carriage destination information and the arrival time information may be included in the two-dimensional code. When only one of the carriage destination information and the arrival time information is included in the two-dimensional code, the other one may be acquired from the order management system 3 in the same manner as in the embodiment.

In the embodiment, the terminal of the shop receives the two-dimensional code including the package ID from the order management system 3, but in this modification example, the terminal receives the two-dimensional code including the package ID, the carriage destination information, and the arrival time information, and prints the two-dimensional code by the printer. The terminal of the shop may receive the package ID, the carriage destination information, and the arrival time information from the order management system 3 and generate the two-dimensional code by itself. As described in the embodiment, the two-dimensional code is attached in the central vicinity of the upper surface of the package.

When the two-dimensional code is read by the reader 45, the transmitter 402 further transmits the carriage destination information and the arrival time information. The reading method of the reader 45 is as described in the embodiment, and when the reader 45 reads the two-dimensional code, the package ID, the carriage destination information, and the arrival time information are acquired. The transmitter 402 transmits those pieces of information together with the unmanned aerial vehicle ID.

When the two-dimensional code is read by the reader 45, the generator 201 generates the flight plan information based on the carriage destination information and the arrival time information included in the two-dimensional code. This modification example is different from the embodiment only in that the carriage destination information and the arrival time information included in the two-dimensional code are used in the case of generating the flight plan information, and the method itself of generating the flight plan information based on those pieces of information is as described in the embodiment.

According to Modification Example (3), the carriage destination information and the arrival time information are included in the two-dimensional code, and hence the information required for generating the flight plan information can be included in the two-dimensional code, to thereby be able to create the flight plan information more quickly. Further, it is no longer required to request or transmit the carriage destination information and the arrival time information between the systems, and hence it is possible to reduce processing loads on the systems, and to reduce a communication amount in the network N.

(4) Further, for example, in the embodiment, the case in which the package is stored in the unmanned aerial vehicle 40 by the shop staff has been described, but the package may be automatically stored in the unmanned aerial vehicle 40 through use of a belt conveyor or the like. Even in such a case, when the package is stored in the holder 44 of the unmanned aerial vehicle 40, the two-dimensional code on the package is read by the reader 45, and the unmanned aerial vehicle ID and the package ID are transmitted to the unmanned aerial vehicle management system 1, to thereby enable the unmanned aerial vehicle management system 1 to identify which package is stored in which unmanned aerial vehicle 40.

The logistics system S of this modification example includes a plurality of unmanned aerial vehicles 40, and each of a plurality of packages is carried by each of the plurality of unmanned aerial vehicles 40. The hardware configuration of each individual unmanned aerial vehicle 40 is as described in the embodiment. Further, as described in the embodiment, a two-dimensional code is attached to each package in the central vicinity of the upper surface.

Figure 11:
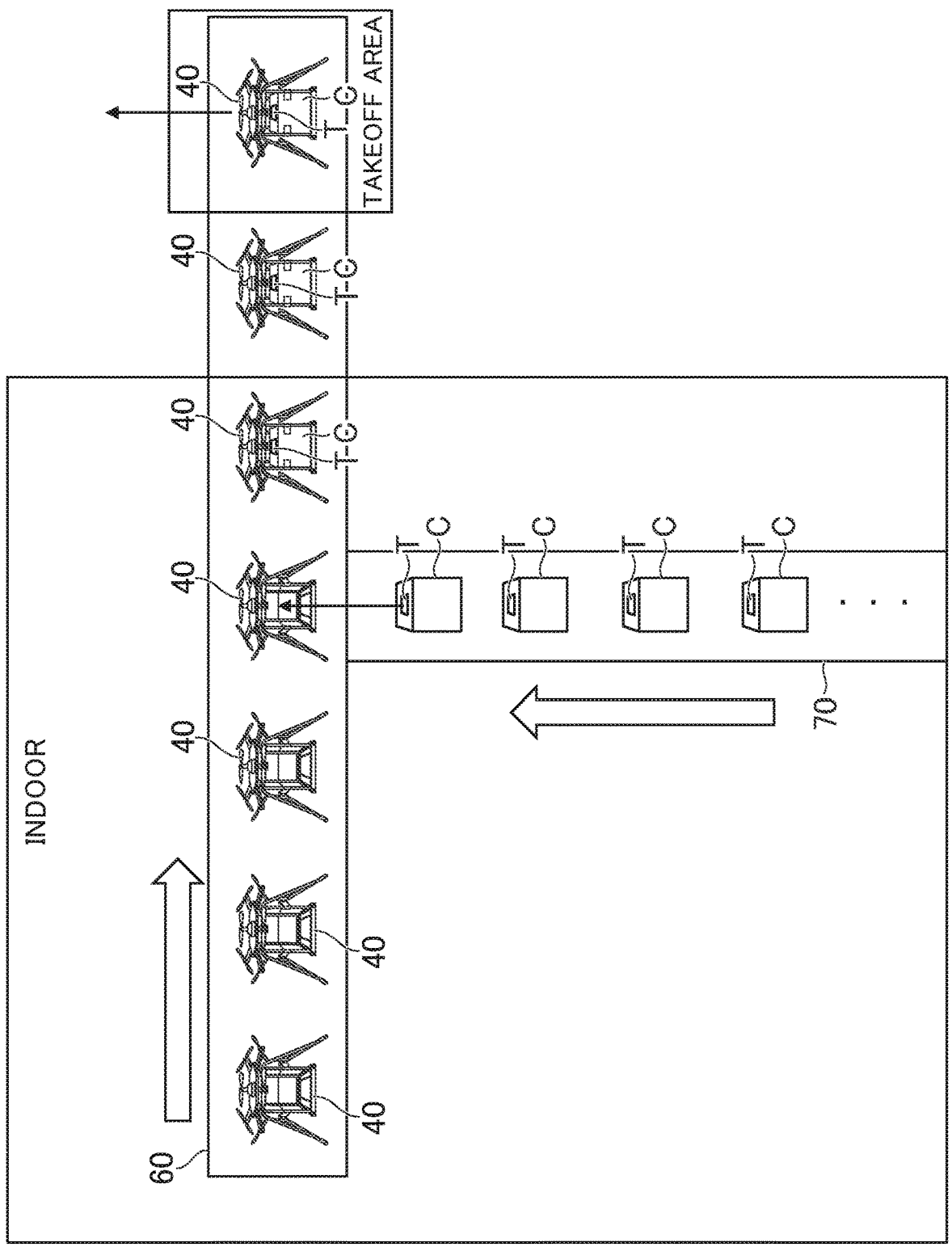
FIG. 11 is a diagram for illustrating a situation in which the unmanned aerial vehicle is automatically loaded with a package.

FIG. 11 is a diagram for illustrating a situation in which the unmanned aerial vehicle 40 is automatically loaded with the package. As illustrated in FIG. 11, the logistics system S includes a first conveyor 60 configured to convey each of the plurality of unmanned aerial vehicles 40 and a second conveyor 70 configured to convey each of the plurality of packages. Each of the first conveyor 60 and the second conveyor 70 includes, for example, a material handling apparatus such as a belt conveyor or an overhead crane, and conveys the unmanned aerial vehicle 40 or the package C to a predetermined position.

The holder 44 of each of the plurality of unmanned aerial vehicles 40 conveyed by the first conveyor 60 stores any one of the plurality of packages C conveyed by the second conveyor 70. For example, when the unmanned aerial vehicle 40 and the package C are conveyed to a predetermined position, the package C is gripped by a robot arm or the like and stored in the holder 44 of the unmanned aerial vehicle 40. It may be determined in advance which package C is stored in which unmanned aerial vehicle 40, but in this embodiment, each package C may be stored in any unmanned aerial vehicle 40.

Each reader 45 of the plurality of unmanned aerial vehicles 40 reads the two-dimensional code on the package C stored in the holder 44.

According to Modification Example (4), when the plurality of packages are to be carried by the plurality of unmanned aerial vehicles 40, it is possible to save the time and labor of bothering to manually store the packages.

(5) Further, for example, in the embodiment, the case in which the reader 45 and the transmitter 402 are physically integrated with the unmanned aerial vehicle 40 and cannot be removed from the unmanned aerial vehicle 40 has been described. However, the reader 45 and the transmitter 402 may be implemented by a reader device provided separately from the unmanned aerial vehicle 40. The reader device is assumed to have the same hardware as that of the communicator 43.

For example, the reader device includes the reader 45 and the transmitter 402, and is connected to the unmanned aerial vehicle 40 so as to be included in the unmanned aerial vehicle as its external device. That is, the reader device is retrofitted to the unmanned aerial vehicle 40. Instead of including the reader 45 and the transmitter 402 in the unmanned aerial vehicle 40 at the time of being sold, the reader device including the reader 45 and the transmitter 402 may be prepared to be externally connected to the unmanned aerial vehicle 40 that does not include the reader 45 and the transmitter 402. For example, when the two-dimensional code is used as the readable medium as in the embodiment, the reader device serves as a code reader having a communication function.

When the two-dimensional code is read by the reader 45, the transmitter 402 of the reader device acquires and transmits the unmanned aerial vehicle ID stored in the unmanned aerial vehicle 40. That is, in the embodiment, the information described as being transmitted by the communicator 43 of the unmanned aerial vehicle 40 may be transmitted by the transmitter 402 of the reader device.

According to Modification Example (5), even when the unmanned aerial vehicle 40 is of a model that does not have the reader 45, it is possible to cause the unmanned aerial vehicle 40 to read the two-dimensional code when the package is stored in the holder 44.

(6) Further, for example, in the embodiment, the case in which the holder 44 holds only one package has been described, but the holder 44 may be able to hold a plurality of packages. In this case, the plurality of packages are stored in the holder 44 at a time by being arranged horizontally or stacked vertically.

For example, the two-dimensional code including the own package ID is attached to each of the plurality of packages. The positions at which the two-dimensional codes are attached to the individual packages may differ from one another, but in this modification example, the two-dimensional codes are assumed to be attached to the same positions.

When the plurality of packages are held by the holder 44, the reader 45 in this modification example reads the two-dimensional code on each of the plurality of packages. The method of reading the two-dimensional code on each individual package is as described in the embodiment. The reader 45 reads the two-dimensional code each time the package is stored in the holder 44.

When the two-dimensional code on each of the plurality of packages is read by the reader 45, the transmitter 402 transmits the package ID of each of the plurality of packages and the unmanned aerial vehicle ID. The transmitter 402 may transmit the package ID and the unmanned aerial vehicle ID each time the two-dimensional code is read, or may avoid transmitting the package ID and the unmanned aerial vehicle ID until the shop staff or the like finishes loading the packages and transmit, collectively at a time, when the shop staff finishes loading the packages and performs a predetermined operation, the unmanned aerial vehicle ID and a plurality of package IDs that have been read so far.

The storage controller stores the package ID of each of the plurality of packages and the unmanned aerial vehicle ID in association with each other in the data storage 100. In this modification example, one unmanned aerial vehicle 40 collectively carries a plurality of packages at a time, and hence a plurality of package IDs are associated with one unmanned aerial vehicle ID. In this case, when all pieces of carriage destination information and arrival time information on the packages are the same, the method of generating the flight plan information is the same as that of the embodiment. Meanwhile, when the carriage destination information and the arrival time information are different for each of the plurality of packages, the generator 201 generates such flight plan information as to travel to the carriage destinations in order so that the arrival at the carriage destination indicated by the carriage destination information on each package takes place at the time indicated by the arrival time information on the each package.

According to Modification Example (6), even when the unmanned aerial vehicle 40 collectively carries a plurality of packages at a time, the plurality of packages can be easily managed. Further, the unmanned aerial vehicle 40 carries the plurality of packages at a time, and hence the packages can be carried more efficiently.

(7) Further, for example, the modification examples described above may be combined.

Further, for example, in the embodiment, the case in which the reader 45 is included in the unmanned aerial vehicle 40 has been described, but the reader 45 and the unmanned aerial vehicle 40 may be provided separately from each other. For example, a reader 45 may be installed near a port for the takeoff and the landing of the unmanned aerial vehicle 40 to cause, before the package is stored in the unmanned aerial vehicle 40, the reader 45 near the port to read the two-dimensional code T, and then store the package in the unmanned aerial vehicle 40. In this case, it suffices that the reader 45 may be arranged at such a position as to enable the two-dimensional code on the package to be read. When a portable reader 45 is used, a worker may carry the portable reader 45 around so that the portable reader 45 can be used immediately. When a fixed reader 45 that is not portable is used, the fixed reader 45 may be arranged at a position less than a predetermined distance from the port.

When an RFID tag is used as the readable medium, the reader 45 serves as the RFID reader, and the RFID enables non-contact reading at a distance of about 10 cm to about 5 m depending on its frequency. For that reason, the reader 45 is arranged at such a position as to enable the non-contact reading depending on the frequency of the RFID to be used. For example, the DFID reader is arranged at a distance of about 10 cm to about 5 m from the port, and reads the RFID tab of the package when the package is stored in the unmanned aerial vehicle 40 on standby in the port. In this case, the unmanned aerial vehicle ID may be acquired by any method. For example, when the reader 45 has a communication function, short-range wireless communication or the like may be used to acquire the unmanned aerial vehicle ID from the unmanned aerial vehicle 40. Further, for example, when the unmanned aerial vehicle 40 on standby is known in advance, the unmanned aerial vehicle ID may be acquired by referring to schedule information on the day or the like. Further, for example, the unmanned aerial vehicle ID may be input by a worker or the like.

Further, for example, when the user orders a product, the flight plan information may be generated in advance in the flight route management system 2 and stored in the two-dimensional code. In this case, the unmanned aerial vehicle 40 may control the flight to the carriage destination of the package by reading the flight plan information stored in the two-dimensional code.

Further, for example, the case in which the logistics system S is applied to the unmanned aerial vehicle 40 has been described, but the logistics system S can also be applied to a scene in which an unmanned ground vehicle carries a package. For example, the unmanned ground vehicle may be provided with the same configuration as that of the reader 45. When the package is stored in the unmanned ground vehicle, the two-dimensional code on the package may be read by the reader 45, and the unmanned ground vehicle may cause a server to manage the package ID stored in the two-dimensional code and an ID for identifying the unmanned ground vehicle itself in association with each other.

Further, for example, the two-dimensional code has been described as an example of the readable medium, but when the RFID tag is used as the readable medium, the RFID reader may be used as the reader 45. Further, for example, when a memory having a short-range wireless communication function is used as the readable medium, the reader 45 may use a communication interface for the short-range wireless communication.

Further, for example, the logistics system S may include another computer (e.g., server computer or personal computer), and each function may be implemented by this computer. Further, for example, it suffices that each function described above may be implemented by any one of the computers included in the logistics system S, and the functions may be shared by the plurality of computers of, for example, the unmanned aerial vehicle management system 1, the flight route management system 2, the order management system 3, the unmanned aerial vehicle 40, and the user terminal 50. Further, the logistics system S is not required to include the plurality of systems, namely, the unmanned aerial vehicle management system 1, the flight route management system 2, and the order management system 3, and the functions may be implemented by a single system or computer.

The invention claimed is:

1. A logistics system, comprising:
an unmanned aerial vehicle including:
a holder configured to hold a package to which a readable medium including package identification information is attached; and
a reader configured to read the readable medium when the package is held by the holder; and
at least one processor configured to:
generate, after the readable medium is read by the reader, flight plan information on the unmanned aerial vehicle based on information read from the readable medium;
control the unmanned aerial vehicle based on the flight plan information;
wherein the readable medium is code information attached to the package,
wherein the reader is a code reader configured to read the code information,
wherein a position of the code information at which the code information is to be attached to the package is determined in advance, and
wherein the code reader is provided at such a position as to enable the code reader to read the code information attached at the position when the package is held by the holder.

2. The logistics system according to claim 1, wherein the at least one processor is configured to:
register the package identification information and at least one of carriage destination information and arrival time information in association with each other, and
generate the flight plan information based on the at least one of the carriage destination information and the arrival time information that has been associated with the package identification information.

3. The logistics system according to claim 2, wherein the at least one processor is configured to:
change the at least one of the carriage destination information and the arrival time information,
generate the flight plan information based on the at least one of the carriage destination information and the arrival time information, when the package identification information is transmitted after a change is made.

4. The logistics system according to claim 2,
wherein the package is a product ordered by a user,
wherein an order management system manages the order of the product, and
wherein a system different from the order management system inquires the at least one of the carriage destination information and the arrival time information from the order management system.

5. The logistics system according to claim 2,
wherein the at least one processor is further configured to register package type information in association with the package identification information, and
wherein the at least one processor is configured to generate the flight plan information based further on the package type information associated with the package identification information.

6. The logistics system according to claim 1,
wherein the unmanned aerial vehicle detects positional information on the unmanned aerial vehicle, and
wherein the at least one processor is configured to generate the flight plan information based further on the positional information.

7. The logistics system according to claim 1,
wherein the readable medium includes at least one of carriage destination information and arrival time information, and wherein the at least one processor is configured to generate the flight plan information based on the at least one of the carriage destination information and the arrival time information acquired by the reader.

8. The logistics system according to claim 1,
wherein the unmanned aerial vehicle detects positional information on the unmanned aerial vehicle, and
wherein the at least one processor is configured to store the package identification information, the positional information and vehicle identification information, in association with one another.

9. The logistics system according to claim 8, wherein the at least one processor is configured to provide, when the package identification information is designated by a user, a carrying situation of the package indicated by the designated package identification information to the user based on the positional information associated with the designated package identification information.

10. The logistics system according to claim 1,
wherein the logistics system has each of a plurality of packages carried by each of a plurality of unmanned aerial vehicles,
wherein the logistics system further comprises:
a first conveyer that conveys each of the plurality of unmanned aerial vehicles; and
a second conveyer that conveys each of the plurality of packages,
wherein any one of the plurality of packages conveyed by the second conveyer is stored in each of the plurality of unmanned aerial vehicles conveyed by the first conveyer, and
wherein the reader of each of the plurality of unmanned aerial vehicles is configured to read the readable medium on the package stored in the holder.

11. The logistics system according to claim 1,
wherein the holder is capable of holding a plurality of packages,
wherein the readable medium is attached to each of the plurality of packages, the readable medium including the package identification information on the each of the plurality of packages,
wherein the reader is configured to read, when the plurality of packages are held by the holder, the readable medium on each of the plurality of packages.

12. A package management method, comprising:
reading, by an unmanned aerial vehicle configured to hold a package to which a readable medium including package identification information is attached, the readable medium when the package is held by the unmanned aerial vehicle;
generating, after the readable medium is read by the unmanned aerial vehicle, flight plan information on the unmanned aerial vehicle based on information read from the readable medium; and
controlling the unmanned aerial vehicle based on the flight plan information;
wherein the readable medium is code information attached to the package,
wherein the reader is a code reader configured to read the code information,
wherein a position of the code information at which the code information is to be attached to the package is determined in advance, and
wherein the code reader is provided at such a position as to enable the code reader to read the code information attached at the position when the package is held by the holder.

13. A package management method, comprising:
reading, by an unmanned aerial vehicle configured to hold a package to which a readable medium including package identification information is attached, the readable medium when the package is held by the unmanned aerial vehicle; and
transmitting the package identification information and unmanned aerial vehicle identification information when the readable medium is read by the unmanned aerial vehicle;
wherein the reading and the transmitting are implemented by a reader device,
wherein the reader device is connected to the unmanned aerial vehicle, and
wherein the reader device is configured to acquire and transmit, when the readable medium is read by the reader, the unmanned aerial vehicle identification information stored in the unmanned aerial vehicle;
wherein the readable medium is code information attached to the package,
wherein the reader is a code reader configured to read the code information,
wherein a position of the code information at which the code information is to be attached to the package is determined in advance, and
wherein the code reader is provided at such a position as to enable the code reader to read the code information attached at the position when the package is held by the holder.

14. A logistics system, comprising:
an unmanned aerial vehicle including:
a holder configured to hold a package to which a readable medium including package identification information is attached; and
a reader configured to read the readable medium when the package is held by the holder; and
at least one processor configured to transmit the package identification information and unmanned aerial vehicle identification information when the readable medium is read by the reader,
wherein the reader and the at least one processor are implemented by a reader device provided separately from the unmanned aerial vehicle, and
wherein the reader device is configured to acquire and transmit, when the readable medium is read by the reader, the unmanned aerial vehicle identification information stored in the unmanned aerial vehicle;
wherein the readable medium is code information attached to the package,
wherein the reader is a code reader configured to read the code information,
wherein a position of the code information at which the code information is to be attached to the package is determined in advance, and
wherein the code reader is provided at such a position as to enable the code reader to read the code information attached at the position when the package is held by the holder.

* * * * *